US011665444B2

(12) United States Patent
Kim et al.

(10) Patent No.: US 11,665,444 B2
(45) Date of Patent: May 30, 2023

(54) IMAGE SENSOR, PIXEL, AND METHOD OF OPERATING THE PIXEL

(71) Applicant: SAMSUNG ELECTRONICS CO., LTD., Suwon-si (KR)

(72) Inventors: Kyungmin Kim, Seoul (KR); Changeun Kang, Gimpo-si (KR); Hoyong Na, Daegu (KR); Jihun Shin, Seongnam-si (KR); Youngtae Jang, Pyeongtaek-si (KR); Youngkyun Jeong, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/561,050

(22) Filed: Dec. 23, 2021

(65) Prior Publication Data

US 2022/0217291 A1  Jul. 7, 2022

(30) Foreign Application Priority Data

Jan. 4, 2021 (KR) .......................... 10-2021-0000444

(51) Int. Cl.
*H04N 25/59* (2023.01)
*H04N 25/58* (2023.01)
*H04N 25/75* (2023.01)

(52) U.S. Cl.
CPC ............ *H04N 25/59* (2023.01); *H04N 25/58* (2023.01); *H04N 25/75* (2023.01)

(58) Field of Classification Search
CPC .. H04N 5/3559; H04N 5/35536; H04N 5/378; H04N 5/37457; H04N 5/35563; H04N 5/3741
See application file for complete search history.

(56) References Cited

U.S. PATENT DOCUMENTS 6,576,882 B2   6/2003  Muramatsu et al.
7,075,049 B2 * 7/2006  Rhodes .............. H04N 5/37452
                                              250/214 AG
(Continued)

FOREIGN PATENT DOCUMENTS

CN        108322677 B * 5/2020 ............. H04N 5/355
KR     10-2007-0060631 A    6/2007

OTHER PUBLICATIONS

Sakano, Yorito et al., "A 132dB Single-Exposure-Dynamic-Range CMOS Image Sensor with High Temperature Tolerance", 2020 IEEE International Solid-State Circuits Conference (ISSCC), Feb. 17, 2020, Downloaded on May 3, 2021. (3 pages total).

*Primary Examiner* — Nhan T Tran
(74) *Attorney, Agent, or Firm* — Sughrue Mion, PLLC

(57) ABSTRACT

An image sensor includes a pixel array, in which a plurality of pixels are arranged, and a row driver for controlling the plurality of pixels. Each of the plurality of pixels includes a first photodiode, a second photodiode having a larger light-receiving area than the first photodiode, a first floating diffusion node in which charges generated by the first photodiode are stored, a first capacitor connected to the first floating diffusion node, and a capacitor control transistor having one end connected in series to the first capacitor. For each of the plurality of pixels, the row driver adjusts capacitance of the first floating diffusion node by using the capacitor control transistor for each of a plurality of preset operation modes during a readout period of the first photodiode.

19 Claims, 17 Drawing Sheets

(56) References Cited

U.S. PATENT DOCUMENTS

| | | |
|---|---|---|
| 8,917,341 B2 | 12/2014 | Sakano et al. |
| 10,645,315 B2 * | 5/2020 | Shim .................... H04N 5/3559 |
| 2019/0215471 A1 * | 7/2019 | Oh .................... H01L 27/14645 |
| 2019/0273879 A1 * | 9/2019 | Xu .................... H04N 5/37452 |
| 2019/0296059 A1 * | 9/2019 | Fritz .................. H04N 5/35563 |
| 2020/0068109 A1 | 2/2020 | Maeta |
| 2020/0137325 A1 * | 4/2020 | Mori ................. H01L 27/14609 |
| 2021/0136275 A1 * | 5/2021 | Solhusvik ............ H04N 5/3535 |

* cited by examiner

IMAGE SENSOR, PIXEL, AND METHOD OF OPERATING THE PIXEL

CROSS-REFERENCE TO RELATED APPLICATION

This application is based on and claims priority under 35 U.S.C. § 119 to Korean Patent Application No. 10-2021-0000444, filed on Jan. 4, 2021, in the Korean Intellectual Property Office, the disclosure of which is incorporated by reference herein in its entirety.

BACKGROUND

The disclosure relates to an image sensor, a pixel, and a method of operating the pixel, and more particularly, an image sensor that secures a dynamic range by using a capacitor and a capacitor control transistor in a split photodiode (PD) pixel, a pixel in the image sensor, and a method of operating the pixel.

Image sensors are devices that capture two-dimensional or three-dimensional images of objects. Image sensors generate images of objects by using photoelectric conversion elements that react according to the intensity of light reflected from the objects. With the recent development of complementary metal-oxide semiconductor (CMOS) technology, CMOS image sensors using CMOS are widely used. Recently, in order to increase the dynamic range of an image sensor, a technology for adding a capacitor to a pixel has been developed.

SUMMARY

The disclosure provides an image sensor, in which a signal-to-noise ratio (SNR) is improved by controlling a capacitor connected to a small photodiode to increase a dynamic range in a split photodiode structure, a pixel in the image sensor, and a method of operating the pixel.

In accordance with an aspect of the disclosure, An image sensor includes a pixel array in which a plurality of pixels are arranged; and a row driver for controlling the plurality of pixels, wherein each of the plurality of pixels includes a first photodiode; a second photodiode having a larger light-receiving area than a light-receiving area of the first photodiode; a first floating diffusion node in which charges generated by the first photodiode are stored; a first capacitor connected to the first floating diffusion node; and a capacitor control transistor comprising one end connected in series to the first capacitor, wherein, for each of the plurality of pixels, the row driver adjusts a capacitance of the first floating diffusion node by using the capacitor control transistor, and wherein the row driver adjusts the capacitance for each of a plurality of preset operation modes during a first readout period of the first photodiode.

In accordance with an aspect of the disclosure, a pixel having a split photodiode structure includes a first photodiode; a second photodiode having a larger light-receiving area than a light-receiving area of the first photodiode; a first floating diffusion node in which charges generated by the first photodiode are stored; a first photodiode transfer transistor including one end connected to the first photodiode and another end connected to the first floating diffusion node; a second floating diffusion node in which charges generated by the second photodiode are stored; a second photodiode transfer transistor including one end connected to the second photodiode and another end connected to the second floating diffusion node; a first capacitor connected to the first floating diffusion node; a capacitor control transistor including one end connected to the first capacitor and another end connected to a first capacitor power supply unit, the capacitor control transistor adjusting capacitance of the first floating diffusion node; and a switch transistor that is turned on during a readout operation of the first photodiode.

In accordance with an aspect of the disclosure, a method of operating a pixel includes turning off a capacitor control transistor in a first period during a first readout period of a first photodiode, the capacitor control transistor being connected in series to a first capacitor that is connected to a first floating diffusion node; operating the pixel in a high conversion gain (HCG) mode, in which a conversion gain of the first floating diffusion node is relatively high, when the capacitor control transistor is turned off; turning on the capacitor control transistor in a second period during the first readout period; and operating the pixel in a low conversion gain (LCG) mode, in which the conversion gain of the first floating diffusion node is relatively low, when the capacitor control transistor is turned on, wherein an illuminance of a pixel signal corresponding to the first photodiode is less than a preset illuminance during the first period, and wherein an illuminance of the pixel signal corresponding to the first photodiode is greater than or equal to the preset illuminance during the second period.

In accordance with an aspect of the disclosure, an image sensor includes a plurality of pixels, at least one of the plurality of pixels including a first photodiode; a second photodiode; a first charge storage region in which charge generated by the first photodiode is stored; a second charge storage region in which charge generated by the second photodiode is stored; a first transistor configured to adjust a capacitance of the first charge storage region; and a second transistor configured to adjust a capacitance of the second charge storage region, wherein the image sensor further includes control circuitry configured to control the first transistor and the second transistor based on an illuminance of the pixel.

BRIEF DESCRIPTION OF THE DRAWINGS

The above and other aspects, features, and advantages of certain embodiments of the disclosure will be more apparent from the following description taken in conjunction with the accompanying drawings in which.

DETAILED DESCRIPTION OF THE EMBODIMENTS

Hereinafter, embodiments of the disclosure will be described in detail with reference to the accompanying drawings.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

Figure 1:
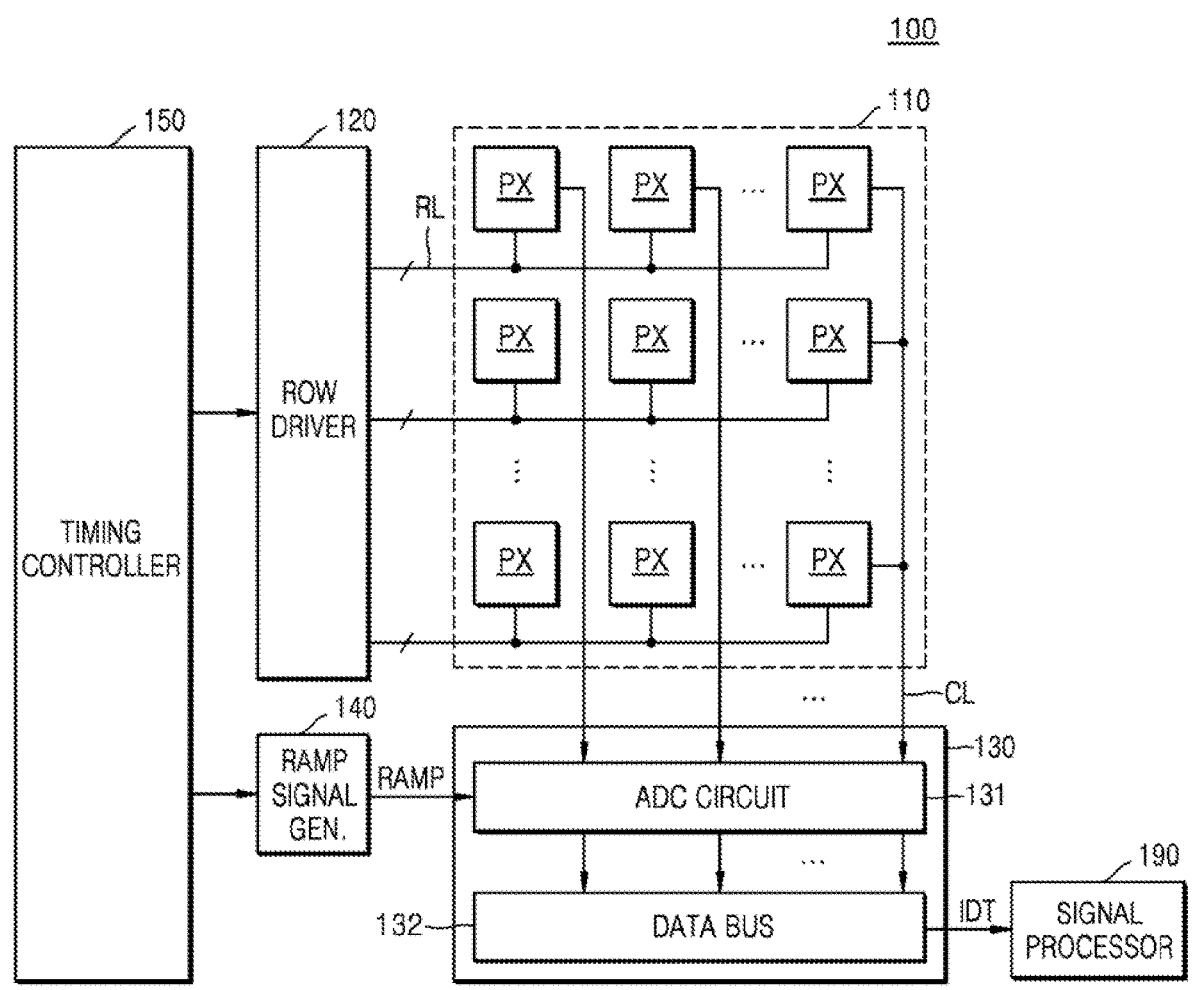
FIG. 1 is a block diagram of an image sensor according to an embodiment.

FIG. 1 is a block diagram of an image sensor 100 according to an example embodiment.

The image sensor 100 may be mounted on an electronic device having an image or light sensing function. For example, the image sensor 100 may be mounted on electronic devices such as a camera, a smartphone, a wearable device, an Internet of things (IoT) device, a home appliance, a tablet personal computer (PC), a personal digital assistant (PDA), a portable multimedia player (PMP), a navigation system, a drone, and an advanced driver assistance system (ADAS). In addition, the image sensor 100 may be mounted on an electronic device that is provided as a component in vehicles, furniture, manufacturing facilities, doors, and various measuring devices.

Referring to FIG. 1, the image sensor 100 may include a pixel array 110, a row driver 120, a readout circuit 130, a ramp signal generator 140, a timing controller 150, and a signal processor 190. The readout circuit 130 may include an analog-to-digital conversion (ADC) circuit 131, and a data bus 132.

The pixel array 110 includes a plurality of pixels PX arranged in rows and columns, and a plurality of row lines RL and a plurality of column lines CL, which are connected to the plurality of pixels PX.

Figure 2:
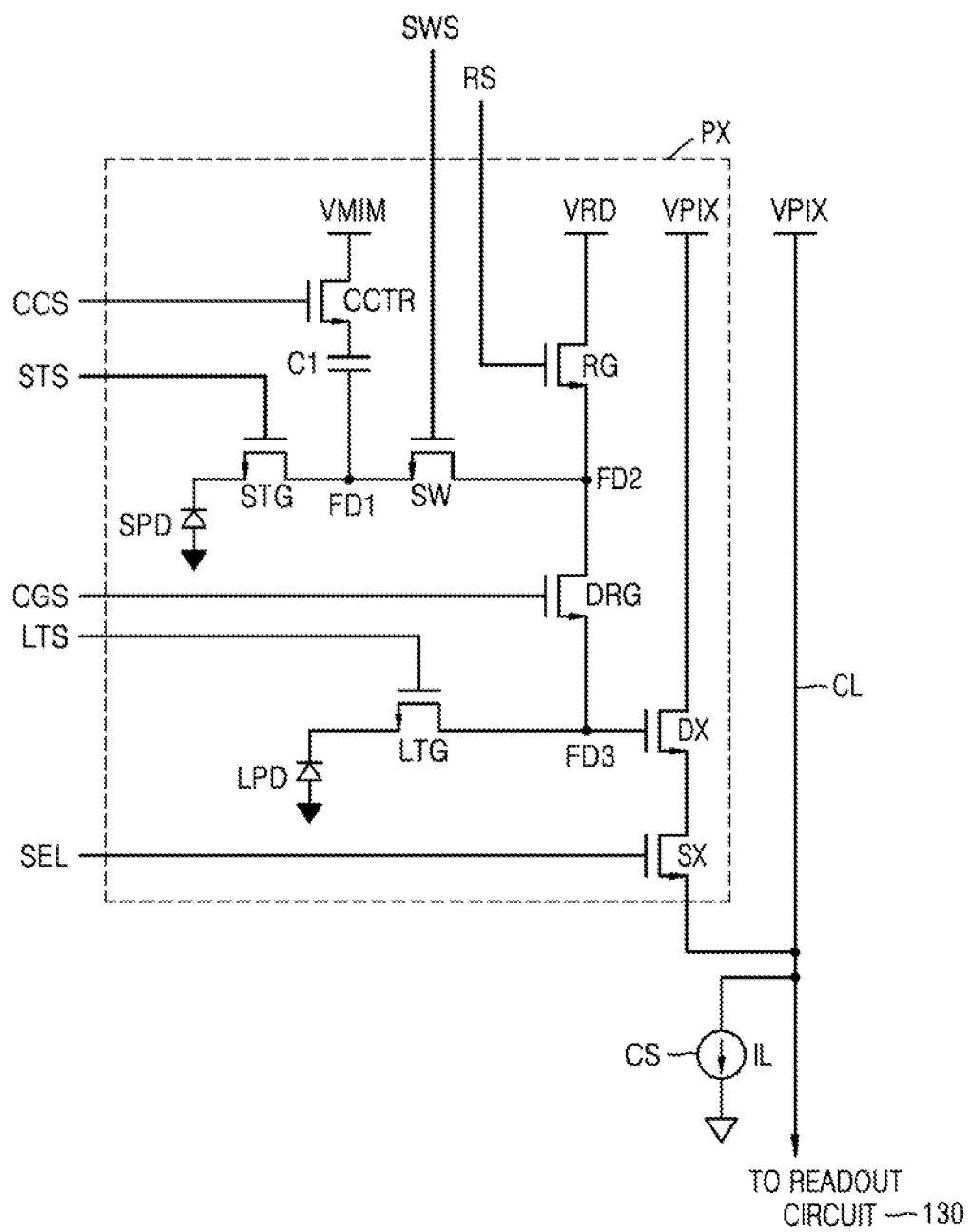
FIG. 2 is a circuit diagram illustrating an implementation example of a pixel according to an embodiment.

Each of the plurality of row lines RL may extend in a row direction and be connected to pixels PX arranged in the same row. For example, each of the plurality of row lines RI, may transmit control signals output from the row driver 120 (e.g., signals RS, STS, LTS, SEL, CGS, SWS, and CCS described below) to each of transistors of a pixel circuit, as illustrated in FIG. 2.

Each of the plurality of pixels PX according to an example embodiment may include at least one photoelectric conversion element (or referred to as a photo-sensing element). The photoelectric conversion element may sense light and convert the sensed light into photocharges. For example, the photoelectric conversion element may be a photo-sensing element including an organic material or an inorganic material, such as an inorganic photodiode, an organic photodiode, a perovskite photodiode, a phototransistor, a photo gate, or a pinned photodiode. In an embodiment, each of the plurality of pixels PX may include a plurality of photoelectric conversion elements.

A microlens for condensing light may be arranged above each of the plurality of pixels PX or above each of pixel groups including adjacent pixels PX. Each of the plurality of pixels PX may detect light in a certain spectral range from light received through a micro lens. For example, the pixel array 110 may include a red pixel for converting light in a red spectral range into an electrical signal, a green pixel for converting light in a green spectral range into an electrical signal, and a blue pixel for converting light in a blue spectral range into an electrical signal. A color filter for transmitting light in a certain spectral range may be arranged on each of the plurality of pixels PX. However, the disclosure is not limited thereto, and the pixel array 110 may include pixels that convert light in spectral ranges other than red, green, and blue spectral ranges into electrical signals.

In an embodiment, each of the plurality of pixels PX may have a multi-layer structure. The pixel having a multi-layer structure may include a plurality of stacked photoelectric conversion elements that convert light in different spectral ranges into electrical signals, and electrical signals corresponding to different colors may be generated by the plurality of photoelectric conversion elements. In other words, electrical signals corresponding to a plurality of colors may be output from one pixel PX.

A color filter array for transmitting light in a certain spectral range may be arranged above the plurality of pixels PX, and a color detectable by a corresponding pixel may be determined according to a color filter arranged above each of the plurality of pixels. However, the disclosure is not limited thereto. In an embodiment, a certain photoelectric conversion element may convert light in a certain wavelength band into an electrical signal according to the level of an electrical signal applied to the photoelectric conversion element.

The pixel PX may be a pixel PX having a split photodiode structure including at least two photodiodes configured to be exposed to one or more optical bursts from a light source, wherein the at least two photodiodes may be exposed or blanked independently of each other. As shown in FIG. 2, for example, the pixel PX may include a small photodiode SPD having a small light-receiving area and a large photodiode LPD having a light-receiving area that is larger than that of the small photodiode. The large photodiode LPD provides low-illuminance pixel signals. The large photodiode LPD may operate in a high conversion gain (HCG) mode in the lowest illuminance period and operate in a low conversion gain (LCG) mode in a general low illuminance period. The small photodiode SPD may operate in a high illuminance period according to an extended exposure time. In the highest illuminance period, sensitivity may be lowered to maintain a long exposure time and a high-capacity capacitor may be used to store a large amount of charge.

The photodiode may operate in a single exposure method or a multi-exposure method. Although the multi-exposure method has advantages in dynamic range or SNR characteristics, there may be a motion artifact or light-emitting diode (LED) flicker problem due to the synthesis of images with different exposure times.

In an embodiment, the pixel PX may use a single exposure method using a split photodiode structure, and may use a method, in which a multi-exposure method is combined with the single exposure method, for some illuminance periods.

For example, the pixel PX may use a single exposure method in which a pixel signal is read out by using a large photodiode LPD in a first period for reading out a pixel signal corresponding to the lowest illuminance and a pixel signal is read out by using a small photodiode SPD in a second period for reading out a pixel signal corresponding to an illuminance higher than that in the first period. Furthermore, the pixel PX may use a multi-exposure method, in which additional exposure is performed by using a large photodiode LPD or a small photodiode SPD to read out a pixel signal corresponding to an illuminance higher than that in the second period, to secure a dynamic range.

Each of the plurality of column lines CL may extend in a column direction and may be connected to pixels PX arranged in the same column. Each of the plurality of column lines CL may transmit, to the readout circuit 130, a reset signal and a sensing signal of the pixels PX in row units of the pixel array 110.

The timing controller 150 may control the timing of the row driver 120, the readout circuit 130, and the ramp signal generator 140. The timing controller 150 may provide timing signals indicating operation timing to each of the row driver 120, the readout circuit 130, and the ramp signal generator 140.

The row driver 120 may generate control signals for driving the pixel array 110 under the control of the timing controller 150 and provide the control signals to each of the plurality of pixels PX of the pixel array 110 through the plurality of row lines RL. The row driver 120 may control the plurality of pixels PX of the pixel array 110 to sense incident light simultaneously or in row units. In addition, the row driver 120 may select pixels PXs in row units from among the plurality of pixels PX, and may control the selected pixels PX (e.g., pixels PX in one row) to output reset signals and sensing signals through the plurality of column lines CL.

The row driver 120 may transmit control signals (e.g., signals RS, STS, LTS, SEL, CGS, SWS, and CCS described below with reference to FIG. 2) for controlling the output of a pixel signal to the pixel array 110, and the pixel PX may output a pixel signal by operating in response to the control signals. In this case, the pixel signal may include a sensing signal and a reset signal. In an embodiment, the row driver 120 may generate control signals for controlling the pixel PX to continuously operate in an HCG mode (i.e., an LPD-H mode) for the large photodiode LPD, an LCG mode (i.e., an LPD-L mode) for the large photodiode LPD, an HCG mode (i.e., an SPD-H mode) for the small photodiode SPD, and an LCG mode (i.e., an SPD-L mode) for the small photodiode SPD during a readout period, and may provide the control signals to the pixel array 110. Control of the pixel PX will be described in detail later with reference to FIGS. 2 to 4.

The ramp signal generator 140 may generate a ramp signal RAMP that increases or decreases with a certain slope, and may provide the ramp signal RAMP to the ADC circuit 131 of the readout circuit 130.

The readout circuit 130 may read out a reset signal and a sensing signal from pixels PX of a row selected by the row driver 120 from among the plurality of pixels PX. The readout circuit 130 may convert reset signals and sensing signals received from the pixel array 110 through the plurality of column lines CL into digital data, based on the ramp signal RAMP from the ramp signal generator 140, and thus may generate and output pixel values corresponding to the plurality of pixels PX in row units.

The ADC circuit 131 may include a plurality of ADCs respectively corresponding to the plurality of column lines CL, and each of the plurality of ADCs may compare each of a reset signal and a sensing signal, which are received through a corresponding column line CL, with the ramp signal RAMP and generate a pixel value based on results of the comparison. For example, the ADC may remove the reset signal from the sensing signal and generate a pixel value indicating the amount of light sensed by the pixel PX.

A plurality of pixel values generated by the ADC circuit 131 may be output as image data IDT through the data bus 132. For example, the image data IDT may be provided to an image signal processor inside or outside the image sensor 100.

The data bus 132 may temporarily store pixel values output from the ADC circuit 131 and then output the temporarily stored pixel values. The data bus 132 may include a plurality of column memories and a column decoder. A plurality of pixel values stored in the plurality of column memories may be output as image data IDT under the control of the column decoder.

The ADC circuit 131 may include a plurality of correlated double sampling (CDS) circuits and a plurality of counter circuits. The ADC circuit 131 may convert a pixel signal (e.g., a pixel voltage) input from the pixel array 110 into a pixel value that is a digital signal. Each pixel signal received through each of the plurality of column lines CL is converted into a pixel value, which is a digital signal, by a CDS circuit and a counter circuit.

The CDS circuit may compare the pixel signal received through the column line CL with the ramp signal RAMP and output a result of the comparison. The CDS circuit may output a comparison signal that transitions from a first level (e.g., logic high) to a second level (e.g., logic low) when the level of the ramp signal RAMP is the same as the level of the pixel signal. A time point at which the level of the comparison signal transitions may be determined according to the level of the pixel signal.

The CDS circuit may sample and hold a pixel signal, which is provided from a pixel PX, according to a CDS method, and may double-sample a certain noise level (e.g., a reset signal) and a level according to an image signal (e.g., a sensing signal) and generate a comparison signal based on a level corresponding to a difference between the reset signal and the sensing signal.

In an embodiment, the CDS circuit may include one or more comparators. For example, each of the comparators may be implemented as an operational transconductance amplifier (OTA) (or a differential amplifier).

The ADC circuit 131 may include a plurality of delta reset sampling (DRS) circuits. The DRS circuits may sample a pixel signal provided by first reading out a pixel signal and then reading out a reset signal, according to a DRS method.

In the pixel array 110 according to an embodiment, the pixel PX may have a dual conversion gain. The dual conversion gain includes an LCG and an HCG. The conversion gain (the unit of the conversion gain may be uV/e) refers to a rate at which charges accumulated in a floating diffusion node FD1, FD2, or FD3 in FIG. 2 are converted into voltage. Charges generated by a photoelectric conversion element may be transferred to and accumulated in a floating diffusion node, and charges accumulated in the floating diffusion node may be converted into a voltage according to a conversion gain. In this case, the conversion gain may vary according to the capacitance of the floating diffusion node. When the capacitance thereof increases, the conversion gain may decrease, and when the capacitance thereof decreases, the conversion gain may increase.

The pixel PX may operate in an LCG mode with a high capacitance of the floating diffusion node or an HCG gain mode with a low capacitance of the floating diffusion node. Even though charges accumulated in the floating diffusion node FD in the HCG gain mode are the same as charges accumulated in the floating diffusion node FD in the LCG gain mode, the voltage of the floating diffusion node FD in the HCG gain mode is higher than the voltage of the floating diffusion node FD in the LCG gain mode. The configuration of the pixel PX and the operation according to the conversion gain mode of the pixel PX will be described in detail later with reference to FIG. 2.

For example, in first image data generated as the large photodiode LPD operates in the HCG mode (i.e., the LPD-H mode) in the plurality of pixels PX of the pixel array 110, a first area (the darkest area) may be clearly displayed, for example, during a first time period in which an illuminance is less than a first value. In second image data generated as the large photodiode LPD operates in the LCG mode (i.e., the LPD-L mode) in the plurality of pixels PX of the pixel array 110, a second area (an area brighter than the first area) may be clearly displayed, for example, during a second time period in which the illuminance is greater than or equal to the first value and less than a second value. In third image data generated as the small photodiode SPD operates in the HCG mode (i.e., the SPD-H mode) in the plurality of pixels PX of the pixel array 110, a third area (an area brighter than the second area and darker than a fourth area described below) may be clearly displayed, for example, during a third time period in which the illuminance is greater than or equal to the second value and less than a third value. In fourth image data generated as the small photodiode SPD operates in the LCG mode (i.e., the SPD-L mode) in the plurality of pixels PX of the pixel array 110, the fourth area (the brightest area) may be clearly displayed, for example, during a fourth time period in which the illuminance is greater than or equal to the third value.

In an embodiment, in one frame in which the pixel array 110 is scanned, each of the plurality of pixels PX may continuously operate in the LPD-H mode, the LPD-S mode, the SPD-H mode, and the SPD-L mode during a readout period, and accordingly, the first image data to the fourth image data (corresponding to the LPD-H mode, the LPD-S mode, the SPD-H mode, and the SPD-L mode) may be generated in one frame period. The first to fourth image data may be merged to create a one-shot image having a high dynamic range in which bright areas (high-illuminance areas) and dark areas (low-illuminance areas) are clearly implemented.

In an embodiment, the image sensor 100 may further include a bias current controller for increasing or decreasing a bias current when the conversion mode of a pixel PX is changed (for example, from the LCG mode to the HCG mode or from the HCG mode to the LCG mode) during a readout period. In this case, a plurality of bias current controllers may be connected to the plurality of column lines CL, respectively. When the conversion mode of the pixel PX is changed, the bias current may vary, and the current amount of the bias current may increase or decrease depending on whether the pixel PX operates in the LCG mode or the HCG mode. For example, when the pixel PX operates in the HCG mode, the current amount of the bias current may be less than that of the bias current when the pixel PX operates in the LCG mode.

The signal processor 190 may perform noise reduction processing, gain adjustment, waveform shaping processing, interpolation processing, white balance processing, gamma processing, edge enhancement processing, binning, and the like on image data. In an embodiment, as the pixel array 100 operates, in one frame period, in an HCG mode (i.e., an LPD-H mode) for the large photodiode LPD, an LCG mode (i.e., an LPD-L mode) for the large photodiode LPD, an HCG mode (i.e., an SPD-H mode) for the small photodiode SPD, and an LCG mode (i.e., an SPD-L mode) for the small photodiode SPD, the signal processor 190 may receive, from the data bus 132, first image data according to the LPD-H mode, second image data according to the LPD-L mode, third image data according to the SPD-H mode, and fourth image data according to the SPD-L mode, and may generate an image having a high dynamic range by merging the first to fourth image data. In an embodiment, the signal processor 190 may be provided in a processor outside the image sensor 100.

FIG. 2 is a circuit diagram illustrating an implementation example of a pixel PX according to an example embodiment.

The pixel PX may include a plurality of photodiodes, such as a small photodiode SPD and a large photodiode LPD. The pixel PX may include a plurality of transistors, such as a transfer transistor STG for the small photodiode SPD, a transfer transistor LTG for the large photodiode LPD, a reset transistor RG, a driving transistor DX, a selection transistor SX, a gain control transistor DRG (or referred to as a conversion gain control transistor), a switch transistor SW, and a capacitor control transistor CCTR, and a capacitor C1.

A voltage applied to the pixel PX may include a pixel voltage VPIX, a capacitor power voltage VMIM, and a reset power voltage VRD. Each of the capacitor power voltage VMIM and the reset power voltage VRD may be supplied in the same manner as that of the pixel voltage VPIX or may be supplied through a separate circuit.

Capacitors, such as parasitic capacitors, may be formed by the floating diffusion nodes FD1, FD2, and FD3 (i.e., charge storage regions). The capacitor C1 may be a passive element having a fixed or variable capacitance, or may be a capacitor for adjusting the capacitance of the floating diffusion node FD1.

The photodiode (i.e., the large photodiode LPD and the small photodiode SPD) may convert light incident from the outside into an electrical signal. The photodiode generates charges according to the intensity of light. The amount of charges generated by the photodiode is variable depending on the photographing environment (low illuminance or high illuminance) of images. For example, the amount of charges generated by the photodiode in a high-illuminance environment may reach the full well capacity (FWC) of the photodiode, but not in a low-light environment. The photodiode may be classified into a large photodiode LPD and a small photodiode SPD according to a relative light-receiving area.

One end of the transfer transistor STG may be connected to the small photodiode SPD and the other end may be connected to the floating diffusion node FD1, and accordingly, charges accumulated in the small photodiode SPD may be stored in the floating diffusion node FD1. One end of the switch transistor SW may be connected to the floating diffusion node FD1, and the other end may be connected to the floating diffusion node FD2. The switch transistor SW may be turned on when the small photodiode SPD is used, and may be turned off when the large photodiode LPD is used. The capacitor C1 may be connected in parallel to the floating diffusion node FD1 to increase the capacitance of the floating diffusion node FD1. A capacitor control transistor CCTR may have one end connected to the capacitor C1 and the other end connected to the capacitor power voltage VMIM.

One end of the transfer transistor LTG may be connected to the large photodiode LPD and the other end may be connected to the floating diffusion node FD3, and accordingly, charges accumulated in the large photodiode LPD may be stored in the floating diffusion node FD3. One end of the reset transistor RG may be connected to the reset power voltage VRD and the other end may be connected to the floating diffusion node FD2, and accordingly, the pixel PX may be reset when a reset control signal RS is applied to the gate of the reset transistor RG. One end of the gain control transistor DRG may be connected to the floating diffusion node FD2 and the other end may be connected to the floating diffusion node FD3, and accordingly, the conversion gain may be adjusted when the large photodiode LPD operates.

The transfer transistor STG for the small photodiode SPD, the transfer transistor LTG for the large photodiode LPD, the reset transistor RG, the driving transistor DX, the selection transistor SX, the gain control transistor DRG, the switch transistor SW, and the capacitor control transistor CCTR may operate in response to control signals provided from the row driver 120, for example, a reset control signal RS, transfer control signals STS and LTS, a selection signal SEL, a gain control signal CGS, a switch signal SWS, and a capacitor control signal CCS, respectively.

The reset transistor RG may be turned on in response to the reset control signal RS applied to the gate terminal thereof, and may reset the floating diffusion nodes FD1, FD2, and FD3 based on the reset power voltage VRD. In this case, the switch transistor SW may be turned on based on a gain control signal SWS received at the gate terminal thereof, and accordingly, the reset power voltage VRD may be applied to the floating diffusion node FD1 and the floating diffusion node FD1 may be reset.

The transfer transistor STG may be turned on in response to the transfer control signal STS applied to the gate terminal thereof, and may transfer charges generated by the small photodiode SPD to the floating diffusion node FD1. The transferred charges may be accumulated (i.e., stored) in the floating diffusion node FD1. In other words, charges may be accumulated in a capacitor formed in the floating diffusion node FD1.

The transfer transistor LTG may be turned on in response to the transfer control signal LTS applied to the gate terminal thereof, and may transfer charges generated by the large photodiode LPD to the floating diffusion node FD3. Charges may be accumulated (i.e., stored) in a capacitor formed in the floating diffusion node FD3. In this case, when the gain control transistor DRG is turned on, charges may also be accumulated in a capacitor formed in the floating diffusion node FD2. In other words, when the gain control transistor DRG is turned on, the capacitor formed in the floating diffusion node FD3 and the capacitor formed in the floating diffusion node FD2 may be connected in parallel to increase the size of capacitance.

The driving transistor DX may operate as a source follower based on a bias current IL generated by a current source CS connected to a column line CL, and may output a voltage corresponding to the voltage of a floating diffusion node through the selection transistor SX.

The selection transistor SX may select the pixel PX. The selection transistor SX may be turned on in response to the selection signal SEL applied to the gate terminal thereof, and may output a voltage (or current) output from the driving transistor DX to the column line CL.

During the operation of the large photodiode LPD, the gain control transistor DRG may be turned on or off based on the gain control signal CGS received at the gate terminal thereof, and a conversion gain when the gain control transistor DRG is in a turn-off state may be higher than a conversion gain when the gain control transistor DRG is in a turn-on state. When the gain control transistor DRG is in a turn-off state, it may be referred to as an LPD-H mode, and when the gain control transistor DRG is in a turn-on state, it may be referred to as an LPD-L mode.

During operation of the large photodiode LPD of the pixel PX, the large photodiode LPD may operate in one of the LPD-H mode and the LPD-L mode according to the turn-on and turn-off of the gain control transistor DRG. In the LPD-H mode, because the conversion gain of the pixel PX may increase, the gain of circuits (e.g., the ADC circuit 131) for processing a voltage output from the pixel PX may be relatively low compared to in the LPD-L mode. Accordingly, the SNR of the image sensor 100 in FIG. 1 may increase, and accordingly, the lowest detectable light intensity may be lowered and the low light intensity detection performance of the image sensor 100 may be improved. In the LPD-L mode, because the capacitance of a floating diffusion node of the pixel PX is relatively large, full well capacity (FWC) may be increased. Accordingly, the high light intensity detection performance of the image sensor 100 may be improved.

During operation of the small photodiode SPD, the capacitor control transistor CCTR may be turned on or off based on the capacitor control signal CCS received at the gate terminal thereof, and a conversion gain when the capacitor control transistor CCTR is in a turn-off state may be higher than a conversion gain when the capacitor control transistor CCTR is in a turn-on state. A detailed principle in which the conversion gain is changed according to the turn-on/turn-off state of the capacitor control transistor CCTR will be described later with reference to FIGS. 3A to 3D. When the capacitor control transistor CCTR is in a turn-off state, it may be referred to as an SPD-H mode, and when the capacitor control transistor CCTR is in a turn-on state, it may be referred to as an SPD-L mode. In the SPD-H mode, the SNR of the image sensor 100 may be improved due to an increase in the conversion gain.

In this way, the pixel PX may sense low-intensity light and high-intensity light by using the large and small photodiodes LPD and SPD having dual conversion gain, and thus, the dynamic range of the image sensor 100 may be enlarged (or increased). For example, in a readout process of the large photodiode LPD, the large photodiode LPD may operate in an HCG mode and an LCG mode, which are set by using the gain control transistor DRG. In a readout process of the small photodiode SPD, the small photodiode SPD may operate in an HCG mode and an LCG mode, which are set by using the capacitor control transistor CCTR.

In addition, as described above with reference to FIG. 1, the pixel PX may continuously operate in an HCG mode (i.e., the LPD-H mode) for the large photodiode LPD, an LCG mode (i.e., the LPD-L mode) for the large photodiode LPD, an HCG mode (i.e., the SPD-H mode) for the small photodiode SPD, and an LCG mode (i.e., the SPD-L mode) for the small photodiode SPD during a readout period. In addition, in the sensor 100, for example, the signal processor 190 in FIG. 1, may generate an image having a high dynamic range by merging all images according to each mode. In particular, in the HCG mode (i.e., the SPD-H mode) for the small photodiode, a conversion gain may be increased by turning off the capacitor control transistor CCTR, and the SNR of the image sensor 100 may be improved by reducing the capacitance of the floating diffusion node FD1.

Figure 3A:
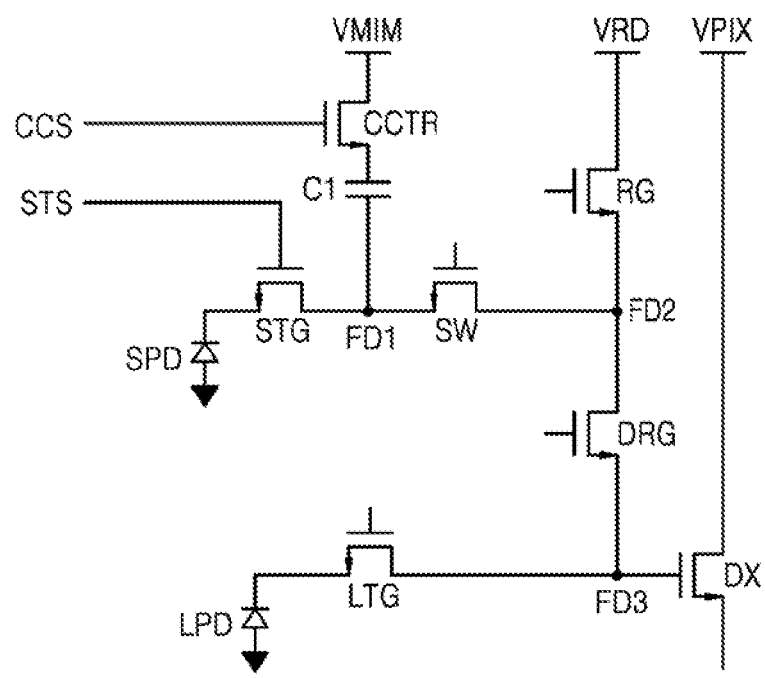
FIGS. 3A to 3D are diagrams illustrating an operation of a pixel according to an embodiment.
Figure 3B:
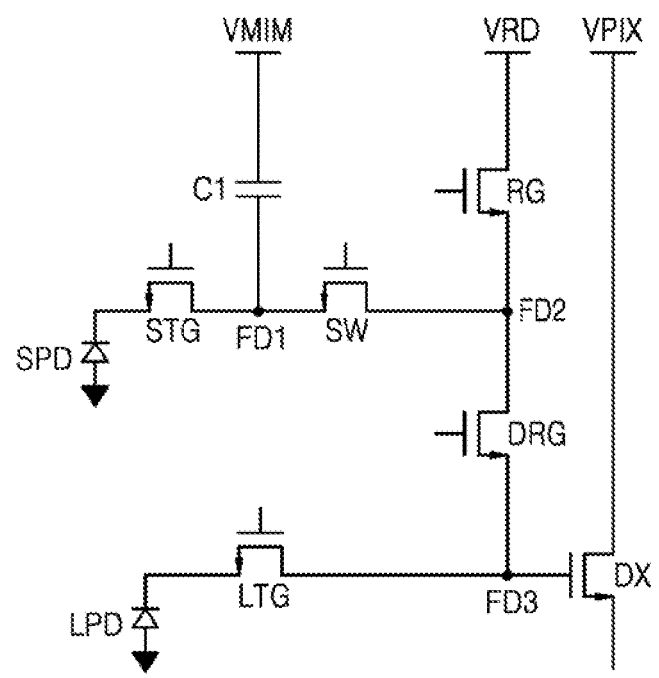
Figure 3C:
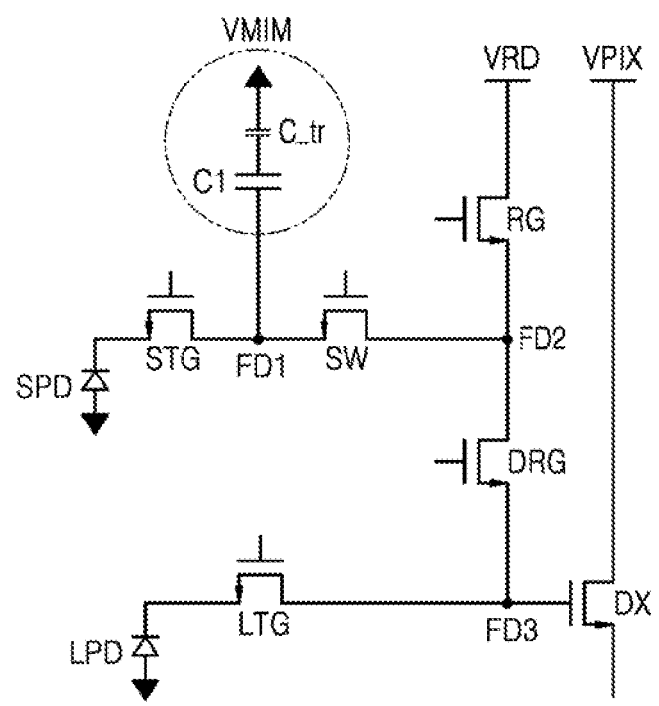
Figure 3D:
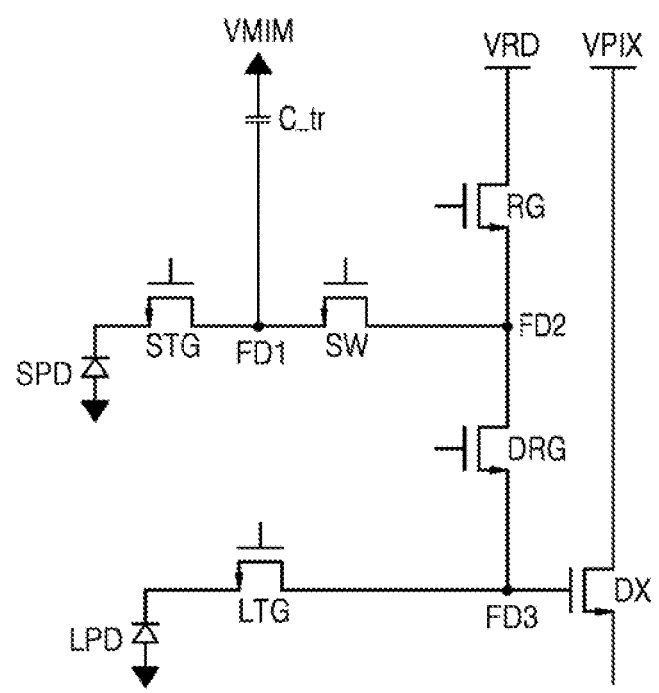

FIGS. 3A to 3D are diagrams illustrating an operation of a pixel according to an example embodiment. In detail, FIGS. 3A to 3D are diagrams illustrating a partial configuration of the pixel PX of FIG. 2. FIG. 3B is a diagram illustrating an SPD-L operation of the pixel PX, and FIGS. 3C and 3D are diagrams illustrating an SPD-H operation of the pixel PX.

Referring to FIGS. 2 and 3A, the pixel PX may include the capacitor control transistor CCTR connected to one end of the capacitor C1 applied to improve the dynamic range of the small photodiode SPD. During a readout operation of the small photodiode SPD, the pixel PX may decrease or increase the conversion gain of the small photodiode SPD by turning on or off the capacitor control transistor CCTR.

Referring to FIG. 3B, in the SPD-L mode, the capacitor control transistor CCTR may be turned on by the capacitor control signal CCS. Accordingly, the capacitance formed in the floating diffusion node FD1 is a capacitance formed by parallel connection of a parasitic capacitor of the floating diffusion node FD1 and the capacitor C1. Also, the capacitance of the capacitor C1 may be greater than that of the parasitic capacitor of the floating diffusion node FD1. Accordingly, when the capacitor control transistor CCTR is turned on, the capacitance of the floating diffusion node FD1 may be similar to that of the capacitor C1.

The capacitor C1 may increase the capacitance of the floating diffusion node FD1. In this case, the capacitance of the floating diffusion node FD1 may include the capacitance of the capacitor C1 connected in series with the floating diffusion node FD1 or the parasitic capacitance of the capacitor control transistor CCTR.)

Referring to FIG. 3C, in the SPD-H mode, the capacitor control transistor CCTR may be turned off by the capacitor control signal CCS, and in this case, the capacitor control transistor CCTR may operate as a parasitic capacitor C_tr. Accordingly, the capacitance formed in the floating diffusion node FD1 is a capacitance formed by serial connection of the capacitor C1 and the parasitic capacitor C_tr. Because the capacitance of the parasitic capacitor C_tr is less than that of the capacitor C1, the capacitance of the floating diffusion node FD1 when the capacitor control transistor CCTR is turned off may be substantially similar to that of the parasitic capacitor C_tr.

Referring to FIG. 3D, when the capacitance of the parasitic capacitor C_tr is considerably less than that of the capacitor C1, the capacitor of the floating diffusion node FD1 in the SPD-H mode may function as the parasitic capacitor C_tr which has a capacitance less than that of the capacitor C1. Accordingly, in the SPD-H mode, the conversion gain of the small photodiode SPD may be increased.

As will be described later with reference to FIG. 6, in the SPD-H mode, a CDS readout method in which a reset signal is first output and then a sensing signal is output may be used. When the CDS readout method is used, noise due to a leakage component of a floating diffusion node may be removed, and a pixel/ADC noise component may mainly remain. The pixel/ADC noise component decreases as the conversion gain increases, and through this, SNR characteristics may be improved in the SPD-H mode. When the sensitivity of the small photodiode SPD is lowered to improve the dynamic range, the SNR characteristics may deteriorate. However, in the SPD-H mode, the sensitivity may be adjusted by increasing the capacitance as much as the SNR characteristics are improved by increasing the conversion gain of the small photodiode SPD.

Figure 4A:
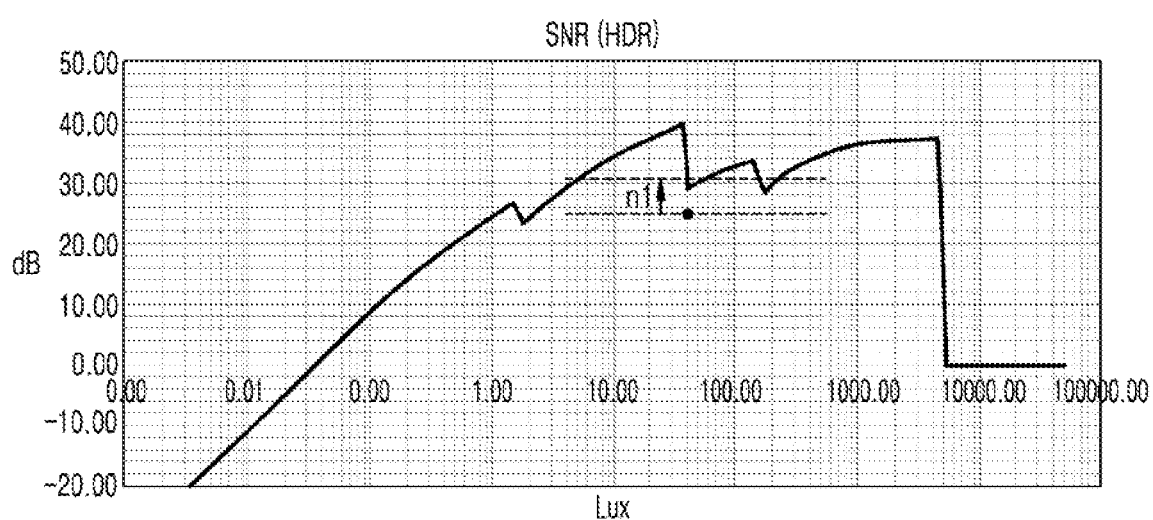
FIGS. 4A and 4B are diagrams illustrating the signal-to-noise ratio (SNR) of a pixel according to an embodiment.
Figure 4B:
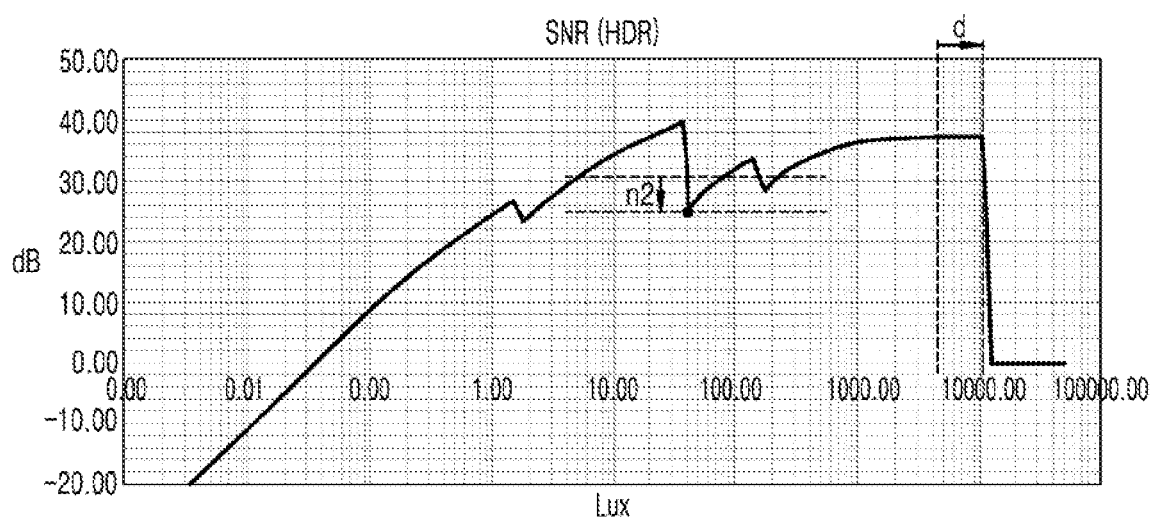

FIGS. 4A and 4B are diagrams illustrating the SNR of a pixel according to an example embodiment.

The dynamic range of the pixel PX may be increased by increasing the capacitance of a floating diffusion node or decreasing the sensitivity of a photodiode. In the case of increasing the capacitance of the floating diffusion node, the SNR characteristics may deteriorate due to a noise component that increases in proportion to the capacitance. In the case of decreasing the sensitivity of the photodiode, the SNR characteristics may deteriorate due to a signal component that decreases in proportion to the sensitivity.

The pixel PX according to an embodiment may expand the dynamic range through the capacitor C1 connected to the floating diffusion node FD1 that accumulates charges of the small photodiode SPD in the SPD-L mode. In addition, the pixel PX may decrease the capacitance of the floating diffusion node FD1 by turning off the capacitor control transistor CCTR connected to the capacitor C1 in the SPD-H mode, thereby increasing the SNR. For example, referring to FIG. 4A, as the conversion gain is increased due to the capacitor control transistor CCTR being turned off in the SPD-H mode, the SNR characteristics may be improved as n1 in a corresponding period.

In addition, the pixel PX according to an embodiment may use a small photodiode SPD having low sensitivity in order to further increase the dynamic range. For example, referring to FIG. 4B, as a small photodiode SPD having low sensitivity is used, the dynamic range may increase by d in the SPD-L mode. In this case, the SNR characteristics may deteriorate by n2 due to the use of the small photodiode SPD having low sensitivity, but the deterioration in the SNR characteristics may be reduced using the capacitor control transistor CCTR.

That is, referring to the structure of the pixel shown in FIG. 3A, the conversion gain in the SPD-H mode may prevent the influence of the capacitance of the capacitor C1 designed for the SPD-L mode by using the capacitor control transistor CCTR. Therefore, even when the dynamic range in the SPD-L mode is increased by increasing the capacity of the capacitor C1, an influence on the SNR in the SPD-H mode may be reduced. Therefore, the dynamic range may be improved by increasing the capacitance of the capacitor C1 considering an allowable SNR level in the SPD-L mode.

Figure 5A:
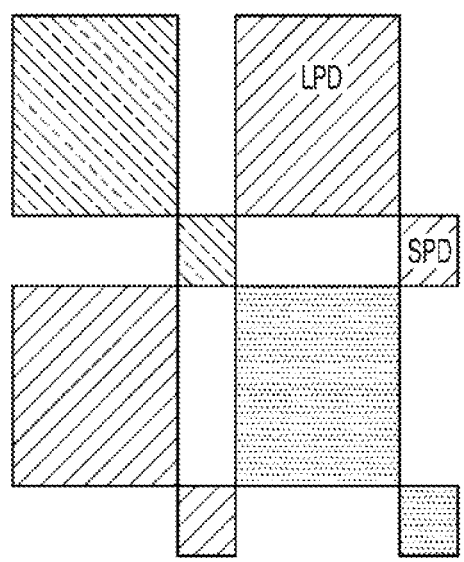
FIGS. 5A and 5B are diagrams illustrating a split photodiode structure of a pixel according to an embodiment.
Figure 5B:
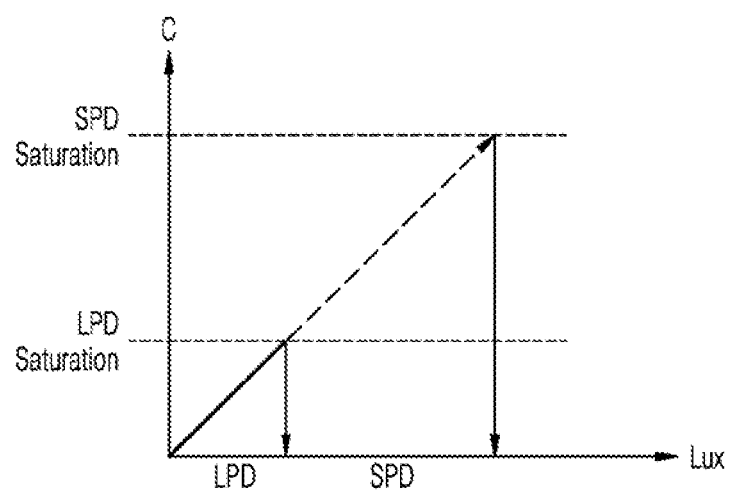

FIGS. 5A and 5B are diagrams illustrating a split photodiode structure of a pixel according to an example embodiment.

Referring to FIG. 5A, the pixel array 110 may include a plurality of pixels PX arranged in rows and columns in a plan view. Each of the plurality of pixels PX may include a photoelectric conversion portion and a pixel circuit portion. The photoelectric conversion portion may vertically overlap the pixel circuit portion.

The photoelectric conversion portion may include a microlens, a color filter, and a photoelectric conversion element. In some embodiments, the photoelectric conversion portion may further include a protective layer and an insulating structure. The microlens may be arranged on the photoelectric conversion element, and may be configured to condense light incident from the outside and cause the condensed light to enter the photoelectric conversion element.

The photoelectric conversion element may include a large photodiode LPD and a small photodiode SPD. In this case, as illustrated in FIG. 5A, on the plurality of pixels PX, the large photodiode LPD may be arranged in a wide area and the small photodiode SPD may be arranged in a narrow area.

Referring to FIG. 5B, the large photodiode LPD has a large light-receiving area and thus may be saturated faster than the small photodiode SPD. Therefore, the large photodiode LPD may be used in a low-illuminance region, and the small photodiode SPD may be used in a high-illuminance region.

The color filter may selectively transmit an optical signal of a certain wavelength band, and may be between the microlens and the photoelectric conversion element. The pixel circuit portion may be formed under the photoelectric conversion portion and may include a floating diffusion node, a source/drain, a load resistor, a gate, a via contact, and a wiring structure.

Figure 6:
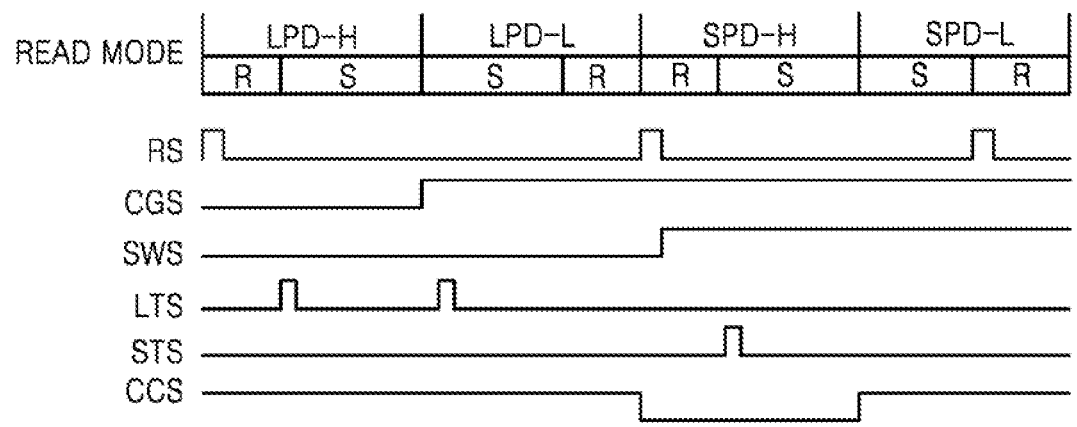
FIG. 6 is a timing diagram illustrating an operation of an image sensor according to an embodiment.

FIG. 6 is a timing diagram illustrating an operation of an image sensor according to an example embodiment.

FIG. 6 is a timing diagram of an image sensor when a pixel signal is read out from the pixel PX of FIG. 2. During one readout period (or referred to as a horizontal period), a plurality of voltages (or a plurality of currents) may be read out from a plurality of pixels PX arranged in at least one row of a pixel array (e.g., the pixel array 110 in FIG. 1).

Referring to FIGS. 2 and 6 together, the selection signal SEL may be at an active level, for example, logic high, during an entirety of the readout period, and the selection transistor SX may be turned on in response to the selection signal SEL, and accordingly, the pixel PX may be connected to the column line CL. In this case, the active level of a signal refers to a level at which a transistor to which the signal is applied may be turned on. In an embodiment, it is assumed that logic high denotes an active level and logic low denotes an inactive level.

One readout period may include a plurality of periods, and each of the plurality of periods may correspond to each of a plurality of different read modes according to a photodiode outputting a pixel signal and a conversion gain. For example, referring to FIG. 6, the plurality of read modes may include LPD-H, LPD-L, SPD-H and SPD-L modes. Each of the plurality of read modes may include a signal period S for outputting a sensing signal and a reset period R for outputting a reset signal.

In the LPD-H mode, a reset signal according to the reset period R may be first output, and then a sensing signal according to the signal period S may be output. For example, referring to FIG. 6, in the reset period R in the LPD-H mode, in response to an active level of the reset control signal RS, the reset transistor RG may be turned on and the floating diffusion node FD3 may be reset. In the reset period R, a reset signal corresponding to a reset level of the pixel PX (e.g., the voltage of the floating diffusion node FD3 that has been reset) may be read out. In this case, because the large photodiode LPD of the pixel PX operates in an HCG mode, a reset signal indicating a reset level may be read out in the HCG mode of the large photodiode LPD.

In the LPD-H mode, in the signal period S, the large photodiode LPD of the pixel PX may operate in an HCG mode, and a sensing signal corresponding to a signal level of the pixel PX may be read out. As the transfer control signal LTS transitions to an active level, for example, logic high, charges generated by the large photodiode LPD may be transferred to and stored in the floating diffusion node FD3. The driving transistor DX may output a sensing signal based on the voltage of the floating diffusion node FD3 according to the amount of charges transferred from the large photodiode LPD.

In the LPD-H mode, the gain control signal CGS may be at logic low, the switch signal SWS may be at logic low, the transfer control signal STS may be at logic low, and the capacitor control signal CCS may be at logic high.

As the gain control signal CGS transitions to an active level, for example, logic high, the gain control transistor DRG may be turned on, and the pixel PX may be switched from the LPD-H mode to the LPD-L mode.

In the LPD-L mode, a sensing signal according to the signal period S may be first output, and then a reset signal according to the reset period R may be output. For example, referring to FIG. 6, in the LPD-L mode, as the transfer control signal LTS transitions to an active level, for example, logic high, in the signal period S, charges generated by the large photodiode LPD may be transferred to and stored in the floating diffusion node FD3. The driving transistor DX may output a sensing signal based on the voltage of the floating diffusion node FD3 according to the amount of charges transferred from the large photodiode LPD.

In the SPD-H mode, a reset signal according to the reset period R may be first output, and then a sensing signal according to the signal period S may be output. For example, referring to FIG. 6, in the reset period R in the SPD-H mode, in response to an active level of the reset control signal RS, the reset transistor RG may be turned on and the floating diffusion node FD1 may be reset. In the reset period R, a reset signal corresponding to a reset level of the pixel PX (e.g., the voltage of the floating diffusion node FD1 that has been reset) may be read out. In this case, a switch signal SWS transitioned to logic high may be applied to the gate of the switch transistor SW of the pixel PX, and a capacitor control signal CCS transitioned to logic low may be applied to the gate of the capacitor control transistor CCTR. A time point at which the switch signal SWS transitions to logic high may be after a time point at which the reset control signal RS transitions to logic low.

In the SPD-H mode, a sensing signal corresponding to a signal level of the pixel PX may be read out during the signal period S. As the transfer control signal STS transitions to an active level, for example, logic high, charges generated by the small photodiode SPD may be transferred to and stored in the floating diffusion node FD1. The driving transistor DX may output a sensing signal based on the voltage of the floating diffusion node FD1 according to the amount of charges transferred from the small photodiode SPD.

In this way, in the SPD-H mode, a sensing signal may be read out in the signal period S after a reset signal is first read out in the reset period R, and a signal from which a noise signal for each pixel is removed may be generated by comparing two signals, that is, the sensing signal and the reset signal. This readout method may be referred to as a CDS readout method.

As the capacitor control signal CCS transitions to an active level, for example, logic high, the capacitor control transistor CCTR may be turned on and the pixel PX may be switched from the SPD-H mode to the SPD-L mode.

In the SPD-L mode, a sensing signal according to the signal period S may be first output, and then a reset signal according to the reset period R may be output. For example, referring to FIG. 6, a sensing signal corresponding to a signal level of the pixel PX may be read out during the signal period S in the SPD-L mode.

In the reset period R in the SPD-L mode, in response to an active level of the reset control signal RS, the reset transistor RG may be turned on and the floating diffusion node FD1 may be reset. In the reset period R, a reset signal corresponding to a reset level of the pixel PX may be read out.

In this way, in the SPD-L mode, a reset signal may be read out in the reset period R after a sensing signal is first read out in the signal period S, and a signal from which a noise signal for each pixel is removed may be generated by comparing two signals, that is, the reset signal and the sensing signal. This readout method may be referred to as a DRS readout method.

The operation order of a plurality of read modes (e.g., LPD-H, LPD-L, SPD-H, and SPD-L modes) of the pixel PX is not limited to the above-described example. For example, a readout operation of the small photodiode SPD may be performed before a readout operation of the large photodiode LPD, and an operation of the LCG mode may be performed before an operation of the HCG mode. In addition, in the readout operation of the pixel PX, the order of the reset period R and the signal period S may be changed in each mode, or after the reset period R in the LCG mode and the reset period R in the HCG mode are first performed, the signal period S in the HCG mode and the signal period S in the LCG mode may be performed. The large photodiode LPD may only operate in one conversion gain mode, and the small photodiode SPD may operate in two conversion gain modes.

In another embodiment, after the pixel PX operates with a single exposure in which at least one of the LPD-H, LPD-L, SPD-H, and SPD-L modes is combined, photography exposure may be added to expand the dynamic range for sections with very high illuminance. For example, an image taken for a short exposure time may be added using a small photodiode SPD. In this case, for the added photography exposure, an exposure time and an exposure interval may be set by considering illuminance information.

The pixel PX may operate regardless of illuminance in the LPD-H, LPD-L, SPD-H, and SPD-L modes, and a data section to be used may be selected based on illuminance information from a readout sensing signal. However, the order or method of operation is not limited thereto.

Figure 7:
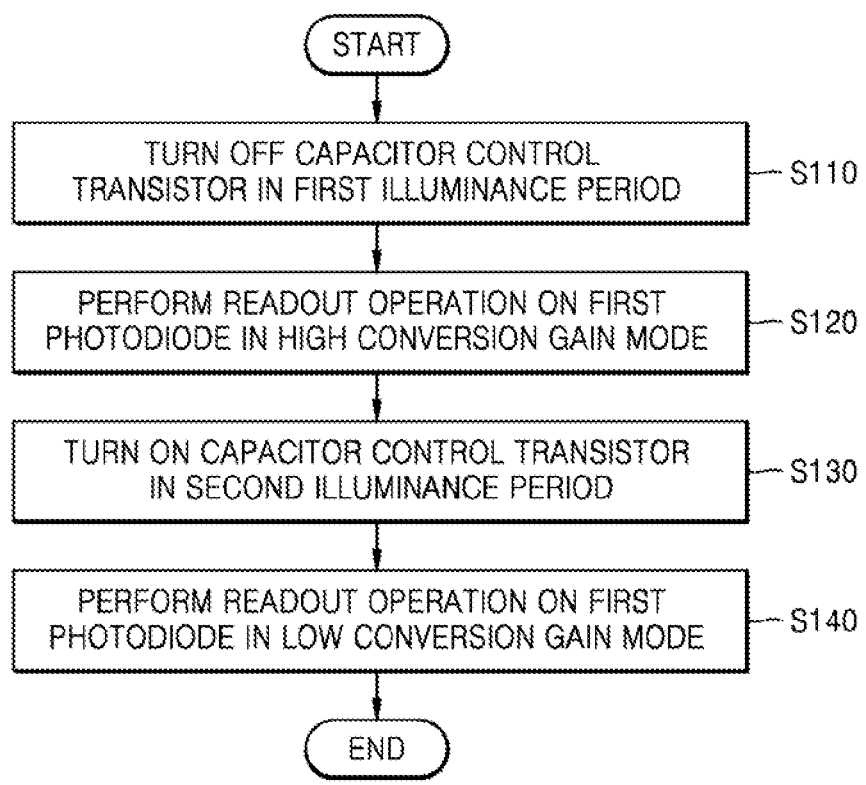
FIG. 7 is a flowchart illustrating an operation of a pixel according to an embodiment.

FIG. 7 is a flowchart illustrating an operation of a pixel according to an example embodiment.

Operations of a pixel, which are described with reference to FIG. 7, may be performed by the pixel PX of FIG. 2. Referring to FIG. 7, the capacitance of a first floating diffusion node may be reduced by turning off a capacitor control transistor in a first period during a readout period of a first photodiode (operation S110). The first photodiode may be a small photodiode having a small light-receiving area. The first floating diffusion node in which charges generated by the first photodiode are stored may be connected in parallel to a first capacitor. The capacitor control transistor may be connected in series to the first capacitor to control the first capacitor.

When the capacitor control transistor is turned off in the first period, a reset signal may be applied to a reset transistor to reset the pixel, and when the pixel is reset, a switch transistor may be turned on and the reset signal may be transferred to a readout circuit. In addition, a transfer control signal may be applied to a first photodiode transfer transistor, and a sensing signal may be transferred to the readout circuit (operation S120).

The capacitance of the first floating diffusion node may be increased by turning on the capacitor control transistor in a second period during the readout period of the first photodiode (operation S130).

When the capacitor control transistor is turned on in the second period, a sensing signal may be transferred to the readout circuit and then a reset signal may be applied to the reset transistor to reset the pixel, and when the pixel is reset, the reset signal may be transferred to the readout circuit (operation S140).

The operating method of the pixel may further include a step in which, during a readout period of a second photodiode, the pixel operates in an HCG mode, in which a gain control transistor is turned off, and an LCG mode, in which the gain control transistor is turned on. The second photodiode may be a photodiode having a larger light-receiving area than the first photodiode.

In this case, the first period may be a period, in which a pixel signal having an illuminance less than a preset illuminance is read out, in an illuminance period in which the first photodiode operates, and the second period may be a period, in which a pixel signal having an illuminance equal to or greater than the preset illuminance is read out, in the illuminance period in which the first photodiode operates. In other words, the first period may be a period during which the first photodiode operates and during which an illuminance of the pixel is less than a preset illuminance, and the second period may be a period during which the first photodiode operates and during which the illuminance of the pixel is greater than or equal to the preset illuminance.

Figure 8A:
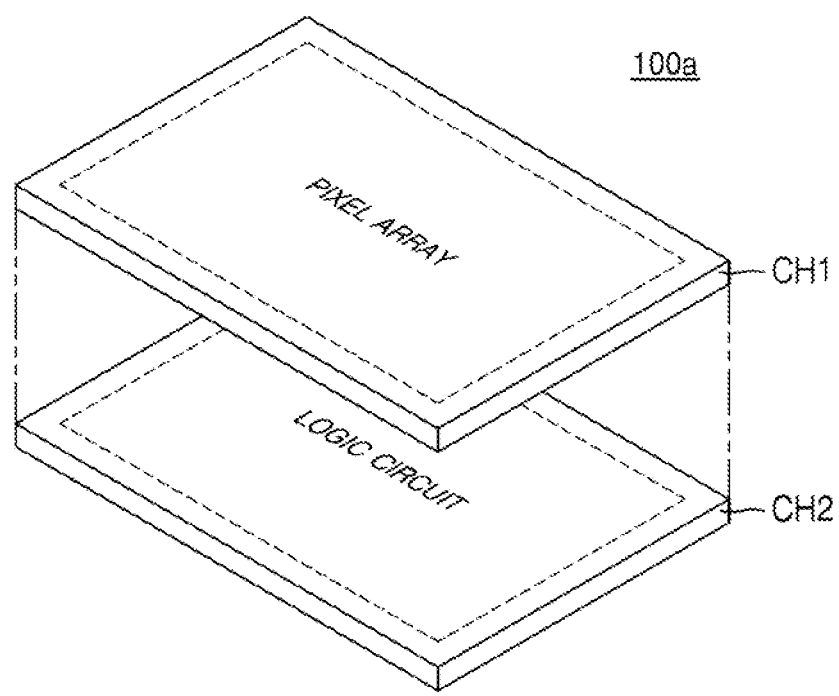
FIG. 8A is an exploded perspective view of an image sensor according to an embodiment.
Figure 8B:
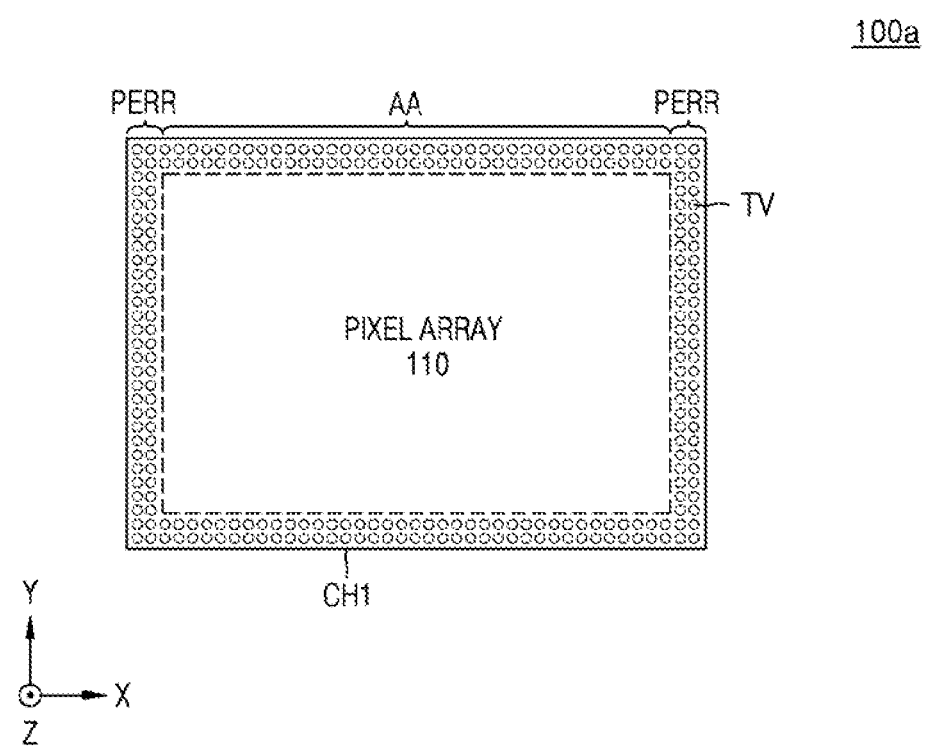
FIGS. 8B and 8C are plan views of the image sensor of FIG. 8A.
Figure 8C:
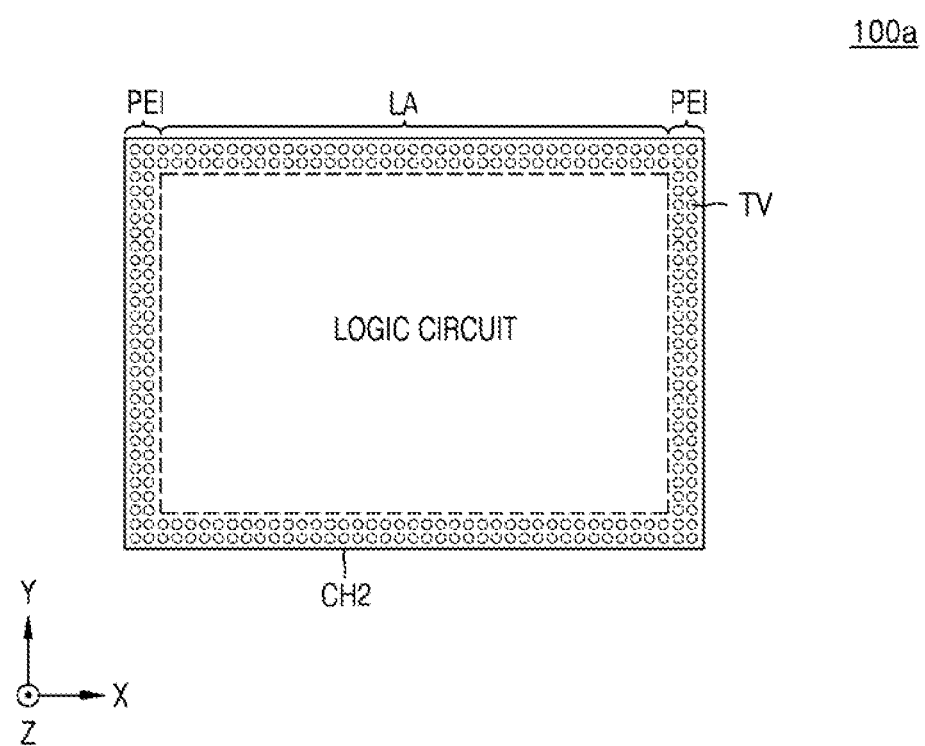

FIG. 8A is an exploded perspective view of an image sensor 100a according to an example embodiment, and FIGS. 8B and 8C are plan views of the image sensor 100a.

Referring to FIGS. 8A through 8C, the image sensor 100a may have a structure in which a first chip CH1 and a second chip CH2 are stacked. A pixel core (e.g., at least one photoelectric conversion element and a pixel circuit) of each of the plurality of pixels PX in the pixel array 110 of FIG. 1 may be formed in the first chip CH1, and logic circuits, for example, the row driver 120, the readout circuit 130, the ramp signal generator 140, and the timing controller 150 of FIG. 1 may be formed in the second chip CH2.

As illustrated in FIGS. 8B and 8C, the first chip CH1 and the second chip CH2 may include an active area AA and a logic area LA, respectively, arranged in the center of the first chip CH1 and the center of the second chip CH2, respectively, and may further include a peripheral area PERR and a peripheral area PEI arranged around the edge of the first chip CH1 and the edge of the second chip CH2, respectively. In the active area AA of the first chip CH1, a photoelectric conversion element and a pixel circuit may be arranged in a two-dimensional array structure. A logic circuit may be arranged in the logic area LA of the second chip CH2.

Through vias extending in a third direction (a Z direction) may be arranged in the peripheral area PERR of the first chip CH1 and the peripheral area PEI of the second chip CH2. The first chip CH1 and the second chip CH1 may be electrically coupled to each other through the through vias. Wiring lines and vertical contacts extending in a first direction (an X direction) or a second direction (a Y direction) may be further formed in the peripheral area PERR of the first chip CH1. A plurality of wiring lines extending in the first direction (the X direction) and the second direction (the Y direction) may also be arranged in a wiring layer of the second chip CH2, and the wiring lines may be connected to the logic circuit.

Although a structure in which the first chip CH1 and the second chip CH2 are electrically coupled to each other through the through vias has been described, the disclosure is not limited thereto. For example, the first chip CH1 and the second chip CH2 may be implemented to have various coupling structures such as copper (Cu)—Cu bonding, coupling of a through via and a Cu pad, coupling of a through via and an external connection terminal, and coupling through an integral through via.

Figure 9:
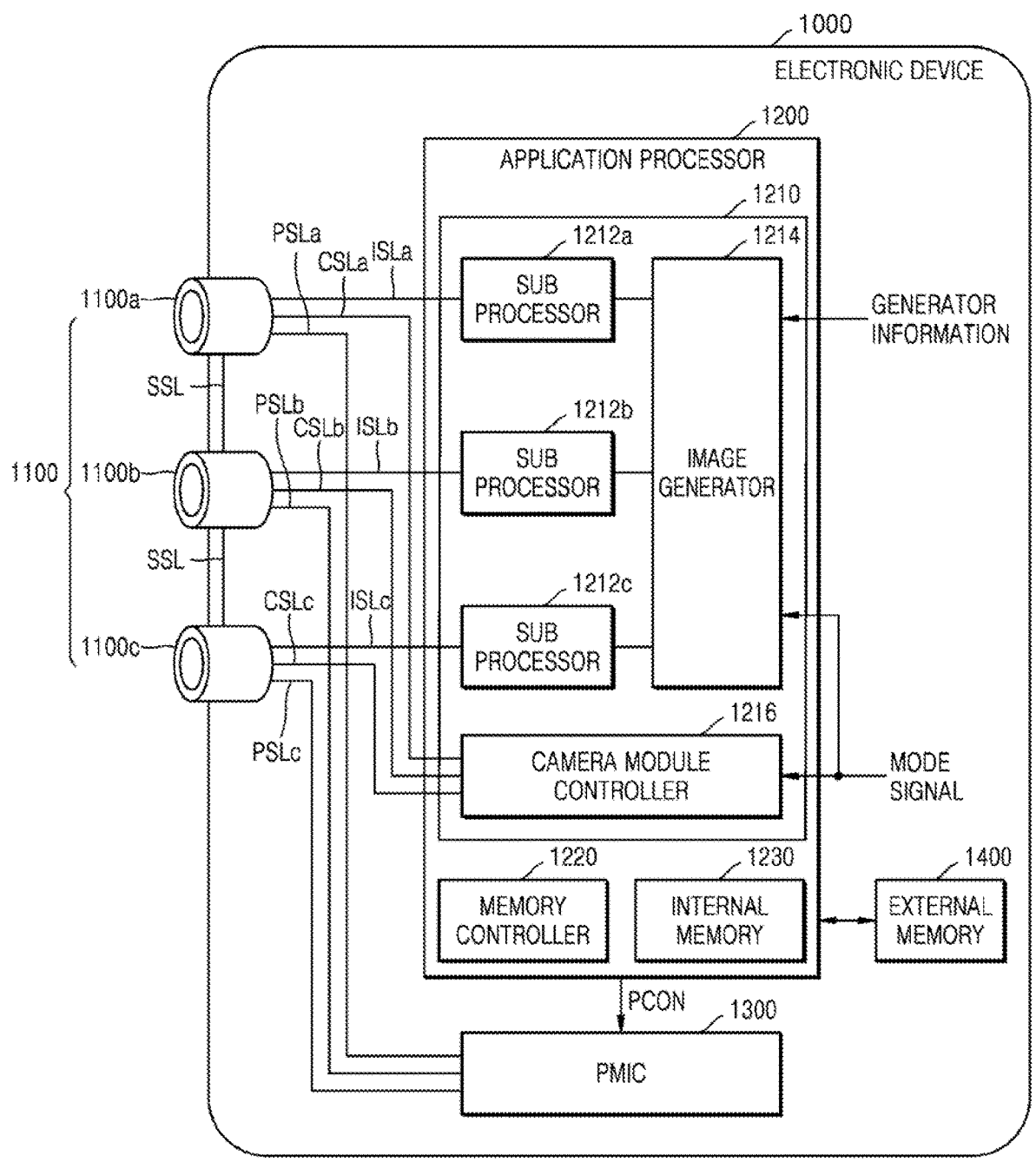
FIG. 9 is a block diagram of an electronic device including a multi-camera module, according to an embodiment.
Figure 10:
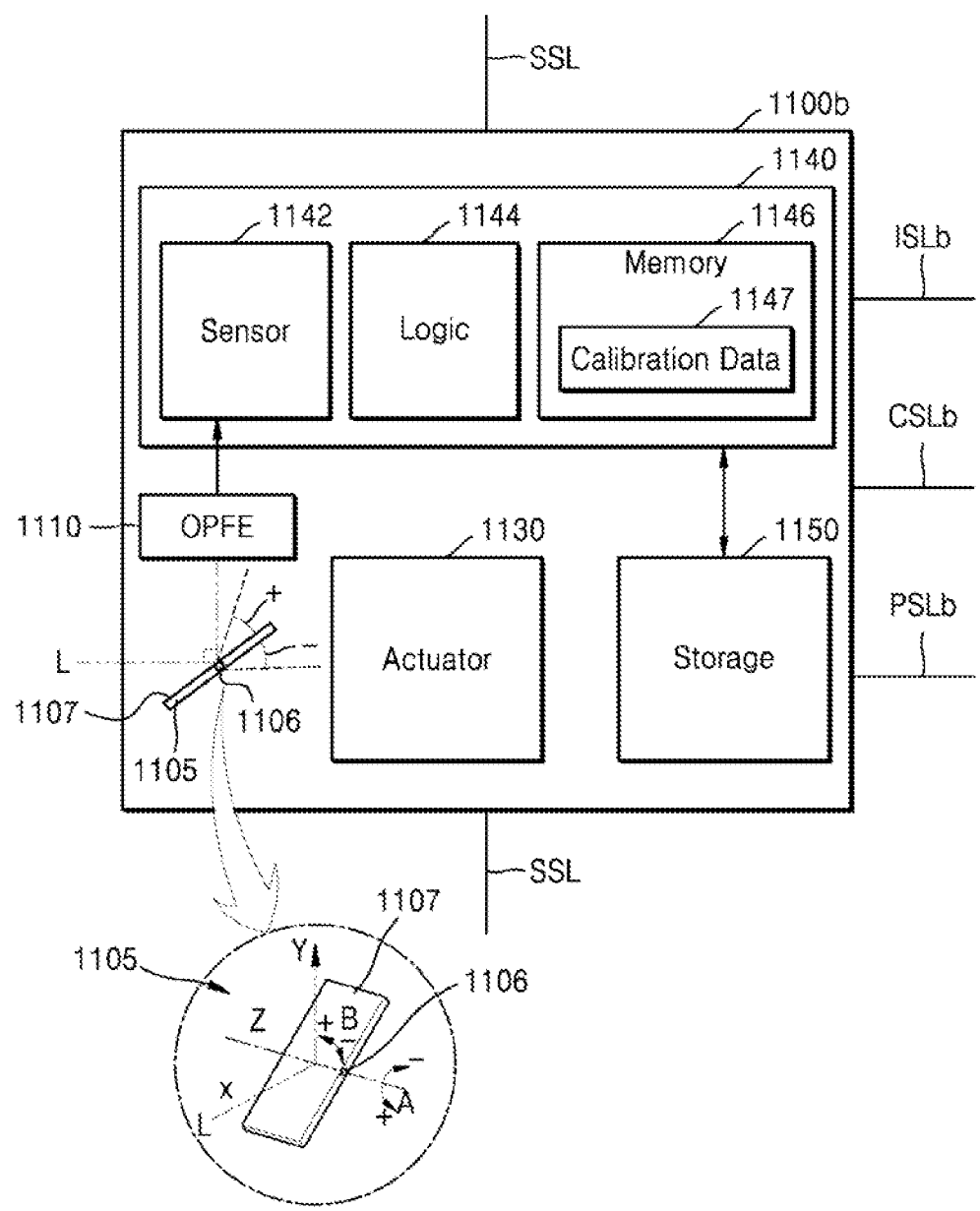
FIG. 10 is a detailed block diagram of a camera module in the electronic device of FIG. 9.

FIG. 9 is a block diagram of an electronic device 1000 including a multi-camera module, according to an example embodiment. FIG. 10 is a detailed block diagram of a camera module in the electronic device 1000 of FIG. 9.

Referring to FIG. 9, the electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 9, the disclosure is not limited thereto. In some embodiments, the camera module group 1100 may be modified to include only two camera modules. In some embodiments, the camera module group 1100 may be modified to include "k" camera modules, where "k" is any natural number of 4 or more.

The detailed configuration of the camera module 1100b will be described with reference to FIG. 10 below. The descriptions below may also applied to the other camera modules 1100a and 1100c.

Referring to FIG. 10, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from outside.

In some embodiments, the prism 1105 may change the path of the light L incident in a first direction (an X direction) into a second direction (a Y direction) perpendicular to the first direction (the X direction). The prism 1105 may rotate the reflective surface 1107 of the light reflecting material in a direction A around a central shaft 1106 or rotate the central shaft 1106 in a direction B to change the path of the light L incident in the first direction (the X direction) into the second direction (the Y direction) perpendicular to the first direction (the X direction). In this case, the OPFE 1110 may move in a third direction (a Z direction), which is perpendicular to both of the first direction (the X direction) and the second direction (the Y direction).

In some embodiments, as illustrated in FIG. 10, an A-direction maximum rotation angle of the prism 1105 may be less than or equal to 15 degrees in a plus (+) A direction and greater than 15 degrees in a minus (−) A direction. However, the disclosure is not limited thereto.

In some embodiments, the prism 1105 may move by an angle of about 20 degrees or in a range from about 10 degrees to about 20 degrees or from about 15 degrees to about 20 degrees in a plus or minus B direction. In this case, an angle by which the prism 1105 moves in the plus B direction may be the same as or similar, within a difference of about 1 degree, to an angle by which the prism 1105 moves in the minus B direction.

In some embodiments, the prism 1105 may move the reflective surface 1107 of the light reflecting material in the third direction (the Z direction) parallel with an extension direction of the central shaft 1106.

The OPFE 1110 may include, for example, "m" optical lenses, where "m" is a natural number. The "m" lenses may move in the second direction (the Y direction) and change an optical zoom ratio of the camera module 1100b. For example, when the default optical zoom ratio of the camera module 1100b is Z, the optical zoom ratio of the camera module 1100b may be changed to 3Z or 5Z or greater by moving the "m" optical lenses included in the OPFE 1110.

The actuator 1130 may move the OPFE 1110 or an optical lens to a certain position. For example, the actuator 1130 may adjust the position of the optical lens such that an image sensor 1142 is positioned at a focal length of the optical lens for accurate sensing.

The image sensing device 1140 may include the image sensor 1142, a control logic 1144, and a memory 1146. The image sensor 1142 may sense an image of an object using the light L provided through the optical lens. The image sensor 1142 may generate image data having a high motion range by merging HCG image data with LCG image data.

The control logic 1144 may control all operations of the camera module 1100b. For example, the control logic 1144 may control operation of the camera module 1100b according to a control signal provided through a control signal line CSLb.

The memory 1146 may store information, such as calibration data 1147, necessary for the operation of the camera module 1100b. The calibration data 1147 may include information, which is necessary for the camera module 1100b to generate image data using the light L provided from outside. For example, the calibration data 1147 may include information about the degree of rotation, information about a focal length, information about an optical axis, or the like. When the camera module 1100b is implemented as a multi-state camera that has a focal length varying with the position of the optical lens, the calibration data 1147 may include a value of a focal length for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some embodiments, although the storage 1150 may include electrically erasable programmable read-only memory (EEPROM), the disclosure is not limited thereto.

Referring to FIGS. 9 and 10, in some embodiments, each of the camera modules 1100a, 1100b, and 1100c may include a respective actuator 1130. Accordingly, the camera modules 1100a, 1100b, and 1100c may include the calibration data 1147, which is the same or different among the camera modules 1100a, 1100b, and 1100c according to the operation of the respective actuator 1130 included in each of the camera modules 1100a, 1100b, and 1100c.

In some embodiments, one (e.g., the camera module 1100b) of the camera modules 1100a, 1100b, and 1100c may be of a folded-lens type including the prism 1105 and the OPFE 1110 while the other camera modules (e.g., the camera modules 1100a and 1100c) may be of a vertical type that does not include the prism 1105 and the OPFE 1110. However, the disclosure is not limited thereto.

In some embodiments, one (e.g., the camera module 1100c) of the camera modules 1100a, 1100b, and 1100c may include a vertical depth camera, which extracts depth information using an infrared ray (IR). In this case, the application processor 1200 may generate a three-dimensional (3D) depth image by merging image data provided from the depth camera (e.g., the camera module 1100c) with image data provided from another camera module (e.g., the camera module 1100a or 1100b).

In some embodiments, at least two camera modules (e.g., 1100a and 1100b) among the camera modules 1100a, 1100b, and 1100c may have different fields of view. In this case, for example, the two camera modules (e.g., 1100a and 1100b) among the camera modules 1100a, 1100b, and 1100c may respectively have different optical lenses. However, the disclosure is not limited thereto.

In some embodiments, the camera modules 1100a, 1100b, and 1100c may have different fields of view from one another. In this case, although the camera modules 1100a, 1100b, and 1100c may respectively have different optical lenses, the disclosure is not limited thereto.

In some embodiments, the camera modules 1100a, 1100b, and 1100c may be physically separated from one another. In other words, the sensing area of the image sensor 1142 is not divided and used by the camera modules 1100a, 1100b, and 1100c, but a respective image sensor 1142 may be independently included in each of the camera modules 1100a, 1100b, and 1100c.

Referring back to FIG. 9, the application processor 1200 may include an image processing unit 1210, a memory controller 1220, and an internal memory 1230. The application processor 1200 may be separately implemented from the camera modules 1100a, 1100b, and 1100c. For example, the application processor 1200 and the camera modules 1100a, 1100b, and 1100c may be implemented in different semiconductor chips.

The image processing unit 1210 may include a plurality of sub-image processors 1212a, 1212b, and 1212c, an image generator 1214, and a camera module controller 1216.

The image processing unit 1210 may include as many sub-image processors 1212a, 1212b, and 1212c as the number of camera modules 1100a, 1100b, and 1100c.

Pieces of image data respectively generated by the camera modules 1100a, 1100b, and 1100c may be respectively provided to the sub-image processors 1212a, 1212b, and 1212c through image signal lines ISLa, ISLb, and ISLc separated from each other. For example, image data generated by the camera module 1100a may be provided to the sub-image processor 1212a through the image signal line ISLa, image data generated by the camera module 1100b may be provided to the sub-image processor 1212b through the image signal line ISLb, and image data generated by the camera module 1100c may be provided to the sub-image processor 1212c through the image signal line ISLc. Such image data transmission may be performed using, for example, a camera serial interface (CSI) of a mobile industry processor interface (MIPI). However, the disclosure is not limited thereto.

In some embodiments, a single sub-image processor may be provided for a plurality of camera modules. For example, the sub-image processors 1212a and 1212c may not be separated but may be integrated into a single sub-image processor, and the image data provided from the camera module 1100a or the camera module 1100c may be selected by a selection element (e.g., a multiplexer) and then provided to the integrated sub-image processor.

The image data provided to each of the sub-image processors 1212a, 1212b, and 1212c may be provided to the image generator 1214. The image generator 1214 may generate an output image using the image data provided from each of the sub-image processors 1212a, 1212b, and 1212c according to image generation information or a mode signal.

In detail, the image generator 1214 may generate the output image by merging at least portions of respective pieces of image data, which are respectively generated by the camera modules 1100a, 1100b, and 1100c having different fields of view, according to the image generation information or the mode signal. Alternatively, the image generator 1214 may generate the output image by selecting one of pieces of image data, which are respectively generated by the camera modules 1100a, 1100b, and 1100c having different fields of view, according to the image generation information or the mode signal.

In some embodiments, the image generation information may include a zoom signal or a zoom factor. In some embodiments, the mode signal may be based on a mode selected by a user.

When the image generation information includes a zoom signal or a zoom factor and the camera modules 1100a, 1100b, and 1100c have different fields of view, the image generator 1214 may perform different operations according to different kinds of zoom signals. For example, when the zoom signal is a first signal, the image generator 1214 may merge image data output from the camera module 1100a and image data output from the camera module 1100c without merging the image data output from the camera module 1100b, and then generate an output image by using a merged image signal and the image data output from the camera module 1100b. When the zoom signal is a second signal different from the first signal, the image generator 1214 may generate an output image by selecting one of the pieces of image data respectively output from the camera modules 1100a, 1100b, and 1100c, instead of performing the merging. However, the disclosure is not limited thereto, and a method of processing image data may be changed whenever necessary.

In some embodiments, the image generator 1214 may receive a plurality of pieces of image data, which have different exposure times, from at least one of the sub-image processors 1212a, 1212b, and 1212c and perform high dynamic range (HDR) processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to a corresponding one of the camera modules 1100a, 1100b, and 1100c through a corresponding one of control signal lines CSLa, CSLb, and CSLc, which are separated from one another.

One (e.g., the camera module 1100b) of the camera modules 1100a, 1100b, and 1100c may be designated as a master camera according to the mode signal or the image generation signal including a zoom signal, and the other camera modules (e.g., the camera modules 1100a and 1100c) may be designated as slave cameras. Such designation information may be included in a control signal and provided to each of the camera modules 1100a, 1100b, and 1100c through a corresponding one of the control signal lines CSLa, CSLb, and CSLc, which are separated from one another.

A camera module operating as a master or a slave may be changed according to a zoom factor or an operation mode signal. For example, when the field-of-view of the camera module 1100a is greater than that of the camera module 1100b and the zoom factor indicates a low zoom ratio, the camera module 1100a may operate as a master and the camera module 1100b may operate as a slave. Contrarily, when the zoom factor indicates a high zoom ratio, the camera module 1100b may operate as a master and the camera module 1100a may operate as a slave.

In some embodiments, a control signal provided from the camera module controller 1216 to each of the camera modules 1100a, 1100b, and 1100c may include a sync enable signal. For example, when the camera module 1100b is a master camera and the camera module 1100a is a slave camera, the camera module controller 1216 may transmit the sync enable signal to the camera module 1100b. The camera module 1100b provided with the sync enable signal may generate a sync signal based on the sync enable signal and may provide the sync signal to the camera modules 1100a and 1100c through a sync signal line SSL. The camera modules 1100a, 1100b, and 1100c may be synchronized with the sync signal and may transmit image data to the application processor 1200.

In some embodiments, a control signal provided from the camera module controller 1216 to each of the camera modules 1100a, 1100b, and 1100c may include mode information according to the mode signal. The camera modules 1100a, 1100b, and 1100c may operate in a first operation mode or a second operation mode in relation with a sensing speed based on the mode information.

In the first operation mode, the camera modules 1100a, 1100b, and 1100c may generate an image signal at a first speed (e.g., at a first frame rate), encode the image signal at a second speed higher than the first speed (e.g., at a second frame rate higher than the first frame rate), and transmit an encoded image signal to the application processor 1200. In this case, the second speed may be 30 times or less the first speed.

The application processor 1200 may store the received image signal, i.e., the encoded image signal, in the internal memory 1230 therein or the external memory 1400 outside the application processor 1200. Thereafter, the application processor 1200 may read the encoded image signal from the internal memory 1230 or the external memory 1400, decode the encoded image signal, and display image data generated based on a decoded image signal. For example, a corresponding one of the sub-image processors 1212a, 1212b, and 1212c of the image processing unit 1210 may perform the decoding and may also perform image processing on the decoded image signal.

In the second operation mode, the camera modules 1100a, 1100b, and 1100c may generate an image signal at a third speed lower than the first speed (e.g., at a third frame rate lower than the first frame rate) and transmit the image signal to the application processor 1200. The image signal provided to the application processor 1200 may not have been encoded. The application processor 1200 may perform image processing on the image signal or store the image signal in the internal memory 1230 or the external memory 1400.

The PMIC 1300 may provide power, e.g., a power supply voltage, to each of the camera modules 1100a, 1100b, and 1100c. For example, under the control of the application processor 1200, the PMIC 1300 may provide first power to the camera module 1100a through a power signal line PSLa, second power to the camera module 1100b through a power signal line PSLb, and third power to the camera module 1100c through a power signal line PSLc.

The PMIC 1300 may generate power corresponding to each of the camera modules 1100a, 1100b, and 1100c and adjust the level of the power, in response to a power control signal PCON from the application processor 1200. The power control signal PCON may include a power adjustment signal for each operation mode of the camera modules 1100a, 1100b, and 1100c. For example, the operation mode may include a low-power mode. In this case, the power control signal PCON may include information about a camera module to operate in the low-power mode and a power level to be set. The same or different levels of power may be respectively provided to the camera modules 1100a, 1100b, and 1100c. The level of power may be dynamically changed.

While the disclosure has been particularly shown and described with reference to embodiments thereof, it will be understood that various changes in form and details may be made therein without departing from the spirit and scope of the following claims.

What is claimed is:

1. An image sensor comprising:
    a pixel array in which a plurality of pixels are arranged; and
    a row driver for controlling the plurality of pixels,
    wherein each of the plurality of pixels comprises:
        a first photodiode;
        a second photodiode having a larger light-receiving area than a light-receiving area of the first photodiode;
        a first floating diffusion node in which charges generated by the first photodiode are stored;
        a first capacitor connected to the first floating diffusion node;
        a capacitor control transistor comprising one end connected in series to the first capacitor,
        a first photodiode transfer transistor connected between the first photodiode and the first floating diffusion node;
        a switch transistor connected between the first floating diffusion node and a second floating diffusion node; and
        a reset transistor connected between the second floating diffusion node and a reset power voltage,
    wherein, for each of the plurality of pixels, the row driver adjusts a capacitance of the first floating diffusion node by using the capacitor control transistor, and
    wherein the row driver adjusts the capacitance for each of a plurality of preset operation modes during a first readout period of the first photodiode.

2. The image sensor of claim 1, wherein the row driver reduces the capacitance of the first floating diffusion node by turning off the capacitor control transistor in a first period during the first readout period, and
    wherein an illuminance of a pixel signal corresponding to the first photodiode is less than a preset illuminance during the first period.

3. The image sensor of claim 2,
    wherein the reset transistor comprises one end connected to the second floating diffusion node and another end to which the reset power voltage is applied,
    wherein the row driver turns on the switch transistor in the first period,
    wherein the row driver resets the first floating diffusion node by turning on the reset transistor in a reset period of the first period and controls a reset signal to be output to a readout circuit, the reset signal corresponding to a voltage of the reset first floating diffusion node, and
    wherein the row driver turns on the first photodiode transfer transistor in a sensing period of the first period to store the charges generated by the first photodiode in the first floating diffusion node and controls a sensing signal to be output to the readout circuit, the sensing signal corresponding to the first floating diffusion node in which the charges are stored.

4. The image sensor of claim 1, wherein the row driver turns on the capacitor control transistor in a second period during the first readout period and stores the charges generated in the first photodiode in both of the first floating diffusion node and the first capacitor, and
wherein an illuminance of a pixel signal corresponding to the first photodiode is greater than or equal to a preset illuminance during the second period.

5. The image sensor of claim 4, wherein
the reset transistor of each of the plurality of pixels resets the first floating diffusion node based on the reset power voltage, and
wherein, in the second period, the row driver controls a sensing signal to be output to a readout circuit, the sensing signal corresponding to the first floating diffusion node, turns on the reset transistor to reset the first floating diffusion node, and controls a reset signal to be output to the readout circuit, the reset signal corresponding to a voltage of the reset first floating diffusion node.

6. The image sensor of claim 2, wherein a sensitivity of the first photodiode to a light source is set based on a change in a signal-to-noise ratio (SNR) that occurs when the row driver reduces the capacitance of the first floating diffusion node in the first period.

7. The image sensor of claim 1, wherein each of the plurality of pixels further comprises:
a gain control transistor connected between a third floating diffusion node and a second floating diffusion node,
wherein the row driver controls each of the plurality of pixels to operate in a high conversion gain (HCG) mode, in which the gain control transistor is turned off, or a low conversion gain (LCG) mode, in which the gain control transistor is turned on, during a second readout period of the second photodiode.

8. The image sensor of claim 7, wherein for each of the plurality of pixels, the row driver turns off the gain control transistor in the HCG mode, turns on a reset transistor to reset the pixel, controls a first reset signal to be transmitted to a readout circuit when the pixel is reset, turns on a second photodiode transfer transistor when the first reset signal is transmitted to the readout circuit and stores charges generated by the second photodiode in the third floating diffusion node, and controls a first sensing signal to be output to the readout circuit, the first sensing signal corresponding to the third floating diffusion node in which the charges are stored, and
wherein for each of the plurality of pixels, the row driver turns on the gain control transistor in the LCG mode, turns on the second photodiode transfer transistor to store charges generated by the second photodiode in the third floating diffusion node, controls a second sensing signal to be output to the readout circuit, the second sensing signal corresponding to the third floating diffusion node in which the charges are accumulated, and controls a second reset signal to be transmitted to the readout circuit when the second sensing signal is transmitted to the readout circuit.

9. The image sensor of claim 1, wherein a readout of the first photodiode uses at least one of a correlated double sampling (CDS) readout of sampling a reset signal and then sampling a sensing signal, and a delta reset sampling (DRS) readout of sampling the sensing signal and then sampling the reset signal.

10. The image sensor of claim 1, further comprising:
a multi-exposure function including a plurality of photography exposures.

11. A pixel having a split photodiode structure, the pixel comprising:
a first photodiode;
a second photodiode having a larger light-receiving area than a light-receiving area of the first photodiode;
a first floating diffusion node in which charges generated by the first photodiode are stored;
a first photodiode transfer transistor comprising one end connected to the first photodiode and another end connected to the first floating diffusion node;
a second floating diffusion node in which charges generated by the second photodiode are stored;
a second photodiode transfer transistor comprising one end connected to the second photodiode and another end connected to the second floating diffusion node;
a first capacitor connected to the first floating diffusion node;
a capacitor control transistor comprising one end connected to the first capacitor and another end connected to a first capacitor power supply unit, the capacitor control transistor adjusting capacitance of the first floating diffusion node; and
a switch transistor that is turned on during a readout operation of the first photodiode.

12. The pixel of claim 11, wherein the capacitor control transistor is turned off in a first period during a readout period of the first photodiode to reduce a capacitance of the first floating diffusion node, and
wherein an illuminance of a pixel signal corresponding to the first photodiode is less than a preset illuminance during the first period.

13. The pixel of claim 12,
wherein the switch transistor is connected between the first floating diffusion node and a third floating diffusion node,
wherein the pixel further comprises a reset transistor comprising one end connected to the third floating diffusion node and another end to which a reset power voltage is applied,
wherein, when the capacitor control transistor is turned off in the first period, the pixel turns on the reset transistor according to a received reset control signal, turns on the switch transistor when the pixel is reset by the turning on of the reset transistor, and transmits a reset signal to a readout circuit, and
wherein the pixel turns on the first photodiode transfer transistor to store charges generated by the first photodiode in the first floating diffusion node and outputs a sensing signal to the readout circuit, the sensing signal corresponding to the first floating diffusion node in which the charges are stored.

14. The pixel of claim 11, wherein the capacitor control transistor is turned on in a second period during a readout period of the first photodiode, and
wherein an illuminance of a pixel signal corresponding to the first photodiode is greater than or equal to a preset illuminance during the second period.

15. The pixel of claim 14, further comprising:
a reset transistor comprising one end connected to a third floating diffusion node and another end to which a reset power voltage is applied, wherein, when the capacitor control transistor is turned on in the second period, the pixel outputs a sensing signal to a readout circuit, turns on the reset transistor according to a received reset control signal, and outputs a reset signal to the readout circuit when the pixel is reset by the turning on of the reset transistor.

16. A method of operating a pixel, the method comprising:
turning off a capacitor control transistor in a first period during a first readout period of a first photodiode, the capacitor control transistor being connected in series to a first capacitor that is connected to a first floating diffusion node;
operating the pixel in a high conversion gain (HCG) mode, in which a conversion gain of the first floating diffusion node is relatively high, when the capacitor control transistor is turned off;
turning on the capacitor control transistor in a second period during the first readout period; and
operating the pixel in a low conversion gain (LCG) mode, in which the conversion gain of the first floating diffusion node is relatively low, when the capacitor control transistor is turned on,
wherein an illuminance of a pixel signal corresponding to the first photodiode is less than a preset illuminance during the first period, and
wherein an illuminance of the pixel signal corresponding to the first photodiode is greater than or equal to the preset illuminance during the second period,
wherein the pixel comprises:
a first photodiode transfer transistor connected between the first photodiode and the first floating diffusion node;
a switch transistor connected between the first floating diffusion node and a second floating diffusion node; and
a reset transistor connected between the second floating diffusion node and a reset power voltage.

17. The method of claim 16, wherein the operating of the pixel in the HCG mode comprises:
when the capacitor control transistor is turned off in the first period, applying a reset control signal to the reset transistor to reset the pixel;
turning on the switch transistor when the pixel is reset and transmitting a reset signal to a readout circuit;
applying a transfer control signal to the first photodiode transfer transistor; and
transmitting a sensing signal to the readout circuit.

18. The method of claim 16, wherein the operating of the pixel in the LCG mode comprises:
when the capacitor control transistor is turned on in the second period, transmitting a sensing signal to a readout circuit;
applying a reset control signal to the reset transistor to reset the pixel; and
transmitting a reset signal to the readout circuit when the pixel is reset.

19. The method of claim 16, wherein the pixel further comprises the second photodiode having a larger light-receiving area than a light-receiving area of the first photodiode, and
wherein the method further comprises operating the pixel in the HCG mode, in which a gain control transistor is turned off, or the LCG mode, in which the gain control transistor is turned on, during a second readout period of the second photodiode.

* * * * *